United States Patent
Liberatore et al.

(10) Patent No.: US 6,500,571 B2
(45) Date of Patent: *Dec. 31, 2002

(54) ENZYMATIC FUEL CELL

(75) Inventors: Michael James Liberatore, Lawrenceville, NJ (US); Leszek Hozer, West Windsor, NJ (US); Attiganal Narayanaswamy Sreeram, Edison, NJ (US); Rajan Kumar, Robbinsville, NJ (US); Chetna Bindra, Piscataway, NJ (US); Zhonghui Hugh Fan, Plainsboro, NJ (US)

(73) Assignee: PowerZyme, Inc., Monmouth Junction, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/376,792

(22) Filed: Aug. 18, 1999

(65) Prior Publication Data

US 2002/0001739 A1 Jan. 3, 2002

Related U.S. Application Data

(60) Provisional application No. 60/097,277, filed on Aug. 19, 1998, provisional application No. 60/118,837, filed on Feb. 5, 1999, provisional application No. 60/126,029, filed on Mar. 25, 1999, and provisional application No. 60/134,240, filed on May 14, 1999.

(51) Int. Cl.[7] .............................................. H01M 8/16
(52) U.S. Cl. ............................................................ 429/2
(58) Field of Search .................................................. 429/2

(56) References Cited

U.S. PATENT DOCUMENTS

| | | |
|---|---|---|
| 3,331,705 A | * 7/1967 | Davis et al. |
| 3,811,950 A | 5/1974 | Avampato et al. |
| 4,101,380 A | 7/1978 | Rubinstein et al. |

(List continued on next page.)

FOREIGN PATENT DOCUMENTS

| | | |
|---|---|---|
| DE | 44 44 893 | 12/1994 |
| WO | WO 89/01159 | 2/1989 |
| WO | WO 93/21528 | 10/1993 |
| WO | WO 96/12317 | 4/1996 |
| WO | WO 97/19480 | 5/1997 |
| WO | WO 97/21256 | 6/1997 |
| WO | WO 98/14505 | 4/1998 |
| WO | WO 98/22989 | 5/1998 |
| WO | WO 98/45694 | 10/1998 |
| WO | WO 99/16137 | 4/1999 |
| WO | WO 99/25759 | 5/1999 |
| WO | WO 99/39841 | 8/1999 |
| WO | WO 99/40237 | 8/1999 |
| WO | WO 99/61368 | 12/1999 |
| WO | WO 00/11745 | 3/2000 |
| WO | WO 00/25377 | 5/2000 |
| WO | WO 00/36679 | 6/2000 |

OTHER PUBLICATIONS

Halme et al., Monitoring And Control Of A Bacteria Fuel Cell Process By Color Analysis, 7th International Conference on Computer Applications on Biotechnology May 31–Jun. 4, Osaka Japan p. 467, 1998.

Copy of Written Opinion, International Application No.: PCT/US99/18804, dated Sep. 1, 2000.

Federation Proceedings 26:1370–1379, 1967 (Mitchell). (No month).

(List continued on next page.)

*Primary Examiner*—Patrick Ryan
*Assistant Examiner*—Susy Tsang-Foster
(74) *Attorney, Agent, or Firm*—Lerner, David, Littenberg, Krumholz & Mentlik, LLP

(57) ABSTRACT

Provided is a fuel cell comprising a first compartment, a second compartment and a barrier separating the first and second compartments, wherein the barrier comprises a proton transporting moiety.

10 Claims, 6 Drawing Sheets

U.S. PATENT DOCUMENTS

| | | | |
|---|---|---|---|
| 4,117,202 A | | 9/1978 | Beck |
| 4,224,125 A | * | 9/1980 | Nakamura et al. |
| 4,235,687 A | | 11/1980 | Romette et al. |
| 4,251,631 A | | 2/1981 | Simon |
| 4,262,063 A | | 4/1981 | Kudo et al. |
| 4,318,784 A | | 3/1982 | Higgins et al. |
| 4,390,603 A | * | 6/1983 | Kawana et al. |
| 4,490,464 A | | 12/1984 | Gorton et al. |
| 4,541,908 A | | 9/1985 | Niki et al. |
| 4,578,323 A | | 3/1986 | Hertl et al. |
| 4,581,336 A | | 4/1986 | Malloy et al. |
| 4,652,501 A | | 3/1987 | Bennetto et al. |
| 4,810,597 A | | 3/1989 | Kumagai et al. |
| 4,970,145 A | | 11/1990 | Bennetto et al. |
| 5,002,871 A | | 3/1991 | Iacobucci |
| 5,126,034 A | | 6/1992 | Carter et al. |
| 5,206,097 A | | 4/1993 | Burns et al. |
| 5,211,984 A | | 5/1993 | Wilson |
| 5,217,900 A | | 6/1993 | Habermann et al. |
| 5,234,777 A | | 8/1993 | Wilson |
| 5,264,092 A | | 11/1993 | Skotheim et al. |
| 5,336,601 A | | 8/1994 | Iacobucci |
| 5,350,681 A | | 9/1994 | Iacobucci et al. |
| 5,393,615 A | | 2/1995 | Corey et al. |
| 5,477,155 A | | 12/1995 | Proulx et al. |
| 5,498,542 A | | 3/1996 | Corey et al. |
| 5,520,786 A | | 5/1996 | Bloczynski et al. |
| 5,599,638 A | | 2/1997 | Surampudi et al. |
| 5,602,029 A | | 2/1997 | Miyamoto |
| 5,635,041 A | | 6/1997 | Bahar et al. |
| 5,672,438 A | | 9/1997 | Banerjee et al. |
| 5,736,026 A | | 4/1998 | Patel et al. |
| 5,741,409 A | | 4/1998 | Raguse et al. |
| 5,756,355 A | | 5/1998 | Lang et al. |
| 5,759,712 A | | 6/1998 | Hockaday |
| 5,773,162 A | | 6/1998 | Surampudi et al. |
| 5,866,353 A | | 2/1999 | Berneth et al. |
| 5,904,740 A | | 5/1999 | Davis |
| 5,919,576 A | | 7/1999 | Hui et al. |
| 5,945,234 A | | 8/1999 | Burns |
| 5,962,638 A | | 10/1999 | Naumann et al. |
| 5,992,008 A | | 11/1999 | Kindler |
| 6,030,718 A | | 2/2000 | Fuglevand et al. |
| 6,087,029 A | | 7/2000 | Golovin et al. |
| 6,087,030 A | | 7/2000 | Collien et al. |

OTHER PUBLICATIONS

Enzyme Microb. Technol. 4:137–142, 1982 (Wingard et al). Review of microbiological and enzyme fuel cells. The use of NADH utilizing enzymes and mediators to facilitate electron transfer to the electrode is discussed. (No month).

J. Biological Physics 13:3–11, 1985 (Bockris). (No month).

Bioelectrochemistry and Energetics 16:479–483, 1986 (Persson et al). Biofuel cell that uses glucose oxidase to generate NADH. Electrons are taken from the NADH (possibly a mediator molecule is used). (No month).

Bioelectrochemistry and Energetics 46:115–122, 1997 (Crundwell). (No month).

Biochemistry, 38:16261–16267, Spher, et al., 1999 Overexpression of the *Escherichia coli* nuo–Operon and Isolation of the Overproduced NADH:Ubiquinone Oxidoreductase (Complex I) (No month).

Angew. Chem. Int. Ed., 39:1180–1218, Willner, 2000. Integration of Layered Redox Proteins and Conductive Supports for Bioelectronic Applications. (No month).

Microbiology (1997), 143, 3633–3647, Andrews, et al. A 12–cistron *Escherichia coli* operon (hyf) encoding a putative proton–translocating formate hydrogenlyase system. (No month).

Landry, et al., Purification and Reconstitution of Epithelial Chloride Channels., Methods in Enzymology, 191, (1987). p. 572–583. (No month).

Schindler, Planar Lip–Protein Membranes: Strategies of Formation and of Detecting Dependencies of Ion Transport Functions on Membrane Conditions, Methods in Enzymology, 1989, 171, p. 225–252. (No month).

Wingard, et al., Bioelectrochemical fuel cells, Enzyme Microb. Technol., 1982, 4, p. 137–142 (No month).

Palmore, et al., A methanol/dioxygen biofuel cell that uses NAD+–dependent dehydrogenases as catalysts . . . , J. Electroanalytical Chem., 1998, 443, p. 155–161. (No month).

Matsue, et al., Electron transferase activity of diaphorase (NADH: acceptor oxidoreductase) from Bacillus Stearothermophilus, Biochemica et Biophysica Acata, 1990, 1038, p. 29–38. (No month).

Madden, Current Concepts in Membrane Protein Reconstitution, Chem & Phys of Lipids, 1986, 40, p. 207–222. (No month).

Helenius, et al., Asymmetric and Symmetric Membrane Reconstitution by Detergent Elimination, Eur. J. Biochem., 1981, 116, p. 27–35. (No month).

Butler, et al., The Effects of Protein on Lipid Organization in a Model Membrane System: A Spin Probe . . . , Can. J. Biochem., 1973, 51, p. 980–989. (No month).

Sweet, et al., Interaction of the Erythrocyte–Membrane Protein, Spectrin, with Model Membrane Systems, Biochem. and Biophys. Res. Comm., 1970, 41, p. 135–141. (No month).

Kim, et al., H+–Pumping ATPase has little stimulatory effect on in vitro . . . , 1997, 7(4), p. 473–477. (No month).

Singer, Interaction of Drugs with a Model Membrane Protein.,Biochemical Pharmacology, 1982, 31(4), p. 527–534. (No month).

Singer, Interaction of Drugs with a Model Membrane Protein, Biochemical Pharmacology, 1980, 29, p. 2651–2655. (No month).

Tran, et al., Requirement for the proton–pumping NADH dehydrogenase I of *Escherichia Coli* . . . , Eur. J. Biochem., 1997, 244, p. 155–160. (No month).

Persson, et al., Biofuel anode for cell reactions involving nicotinamide adenine . . . , Bioelectrochem. and Bioenerget., 1986, 16, pp. 479–483. (No month).

Kinoshita, et al., Flavor Characterization to Fuel Cells. Kirk–Othmer Encyclopedia of Chem. Technology, 11, pp. 1098–1121. (No date).

Schrenzel, et al., Electron currents generated by the human phagocyte NADPH oxidase. Nature, Apr., 1998, 392, pp. 734–737. (No month).

Malinauskas, et al., Electrocatalytic Oxidation of Coenzyme NADH at Carbon Paste Electrodes, Modified with Zirconium Phosphate and Some Redox Mediators, J. Colloid and Interface Science, 2000, 224, pp. 325–332. (No month).

Montal, et al., Functional reassembly of membrane proteins in planar lipid bilayers, Quarterly Reviews of Biophys., 1981, 14(1), pp. 1–79. (No month).

* cited by examiner

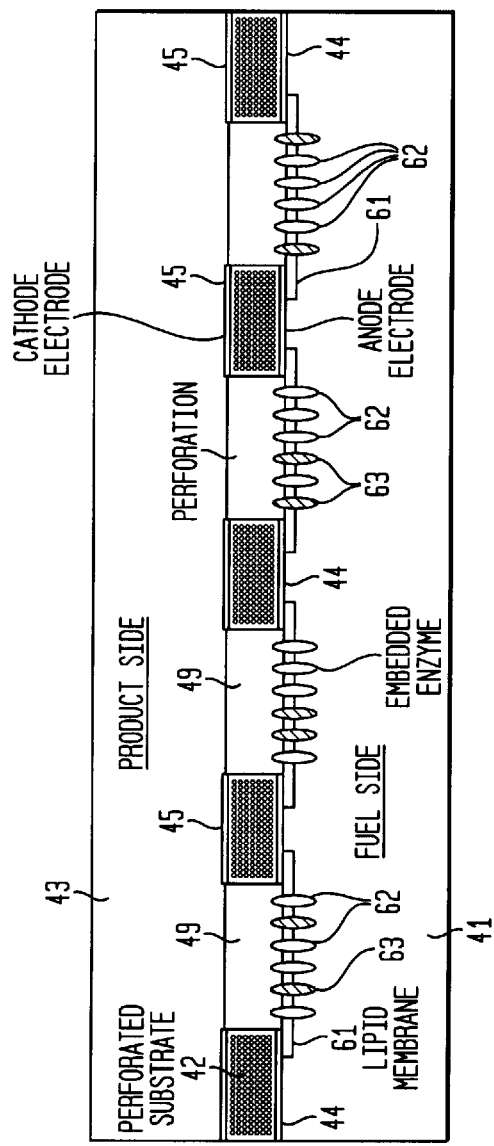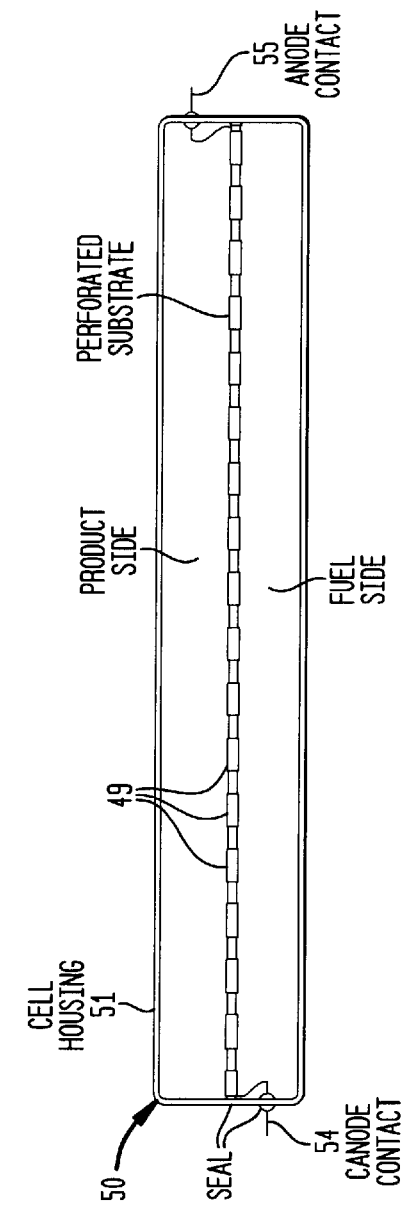

ENZYMATIC FUEL CELL

This application claims the benefit of each of U.S. Provisional Applications Nos. 60/097/277, filed Aug 19, 1998; 60/118,837, filed Feb. 5, 1999; 60/126,029, filed Mar. 25, 1999; and 60/134,240, filed May 14, 1999, the disclosures of which are all hereby incorporated by reference.

The present invention relates to batteries, including fuel cells and re-chargeable fuel cells, for use in powering electrical devices.

Batteries such as fuel cells are useful for the direct conversion of chemical energy into electrical energy. Fuel cells are typically made up of three chambers separated by two porous electrodes. A fuel chamber serves to introduce a fuel, typically hydrogen gas, which can be generated in situ by "reforming" hydrocarbons such as methane with steam, so that the hydrogen contacts $H_2O$ at the first electrode, where, when a circuit is formed between the electrodes, a reaction producing electrons and hydronium ($H_3O^+$) ions is catalyzed.

$$2H_2O + H_2 \rightleftharpoons 2H_3O^+ + 2e^- \quad (1)$$

A central chamber can comprise an electrolyte. The central chamber acts to convey hydronium ions from the first electrode to the second electrode. The second electrode provides an interface with a recipient molecule, typically oxygen, found in the third chamber. The recipient molecule receives the electrons conveyed by the circuit.

$$2H_3O^+ + 1/2 O_2 + 2e^- \rightleftharpoons 3H_2O \quad (2)$$

The electrolyte element of the fuel cell can be, for example, a conductive polymer material such as a hydrated polymer containing sulfonic acid groups on perfluoroethylene side chains on a perfluoroethylene backbone such as Nafion™ (du Pont de Nemours, Wilmington, Del.) or like polymers available from Dow Chemical Co., Midland, Mich. Other electrolytes include alkaline solutions (such as 35 wt %, 50 wt % or 85 wt % KOH), acid solutions (such as concentrated phosphoric acid), molten electrolytes (such as molten metal carbonate), and solid electrolytes (such as solid oxides such as yttria ($Y_2O_3$)-stabilized zirconia ($ZrO_2$)). Liquid electrolytes are often retained in a porous matrix. Such fuel cells are described, for example, in "Fuel Cells," *Kirk-Othmer Encyclopedia of Chemical Technology*, Fourth Edition, Vol. 11, pp. 1098–1121.

These types of fuel cells typically operate at temperatures from about 80° C. to about 1,000° C. The shortcomings of the technology include short operational lifetimes due to catalyst poisoning from contaminants, high initial costs, and the practical restrictions on devices that operate at relatively high to extremely high temperatures.

The present invention provides a fuel cell technology that employs molecules used in biological processes to create fuel cells that operate at moderate temperatures and without the presence of harsh chemicals maintained at high temperatures, which can lead to corrosion of the cell components. While the fuel used in the fuel cells of the invention are more complex, they are readily available and suitably priced for a number of applications, such as power supplies for mobile computing or telephone devices. It is anticipated that fuel cells of the invention can be configured such that a 300 cc cell has a capacity of as much as 80 W·h—and thus can have more capacity than a comparably sized battery for a laptop computer—and that such cells could have still greater capacity. Thus, it is believed that the fuel cells of the invention can be used to increase capacity, and/or decrease size and/or weight. Moreover, the compact, inert energy sources of the invention can be used to provide short duration electrical output. Since the materials retained within the fuel cells are non-corrosive and typically not otherwise hazardous, it is practical to recharge the fuel cells with fuel, with the recharging done by the consumer or through a service such as a mail order service.

Moreover, in certain aspects, the invention provides fuel cells that use active transport of protons to increase sustainable efficiency. Fuel cells of the invention can also be electrically re-charged.

SUMMARY OF THE INVENTION

In one aspect, the invention provides a fuel cell comprising a first compartment, a second compartment and a barrier separating the first and second compartments, wherein the barrier comprises a proton transporting moiety.

In another aspect, the invention provides a fuel cell a first compartment; a second compartment; a barrier separating the first compartment from the second compartment; a first electrode; a second electrode; a redox enzyme in the first compartment in communication with the first electrode to receive electrons therefrom, the redox enzyme incorporated in a lipid composition; an electron carrier in the first compartment in chemical communication with the redox enzyme; and an electron receiving composition in the second compartment in chemical communication with the second electrode, wherein, in operation, an electrical current flows along a conductive pathway formed between the first electrode and the second electrode.

BRIEF DESCRIPTION OF THE DRAWINGS

FIGS. 3A, 3B and 3C illustrate a similar fuel cell with scavenger-containing segment.

FIG. 5A shows a top view of a fuel cell with two chambers, while

DEFINITIONS

The following terms shall have, for the purposes of this application, the respective meaning set forth below.

electron carrier: An electron carrier is a composition that provides electrons in an enzymatic reaction. Electron carriers include, without limitation, reduced nicotinamide adenine dinucleotide (denoted NADH; oxidized form denoted NAD or $NAD^+$), reduced nicotinamide adenine dinucleotide phosphate (denoted NADPH; oxidized form denoted NADP or $NADP^+$), reduced nicotinamide mononucleotide (NMOSH; oxidized form NMN), reduced flavin adenine dinucleotide ($FADH_2$; oxidized form FAD), reduced flavin mononucleotide ($FMNH_2$; oxidized form FMN), reduced coenzyme A, and the like. Electron carriers include proteins with incorporated electron-donating prosthetic groups, such as coenzyme A, protoporphyrin IX, vitamin B12, and the like Further electron carriers include glucose (oxidized form: gluconic acid), alcohols (e.g., oxidized form: ethylaldehyde), and the like. Preferably the electron carrier is present in a concentration of 1 M or more, more preferably 1.5 M or more, yet more preferably 2 M or more.

electron-receiving composition: An electron-receiving composition receives the electrons conveyed to the cathode by the fuel cell.

electron transfer mediator: An electron transfer mediator is a composition which facilitates transfer to an electrode of electrons released from an electron carrier.

redox enzyme: An redox enzyme is one that catalyzes the transfer of electrons from an electron carrier to another composition, or from another composition to the oxidized form of an electron carrier. Examples of appropriate classes of redox enzymes include: oxidases, dehydrogenases, reductases and oxidoreductases. Additionally, other enzymes, will redox catalysis as their secondary property could be used e.g., superoxide dismutase.

composition. Composition refers to a molecule, compound, charged species, salt, polymer, or other combination or mixture of chemical entities.

DETAILED DESCRIPTION

Figure 1:
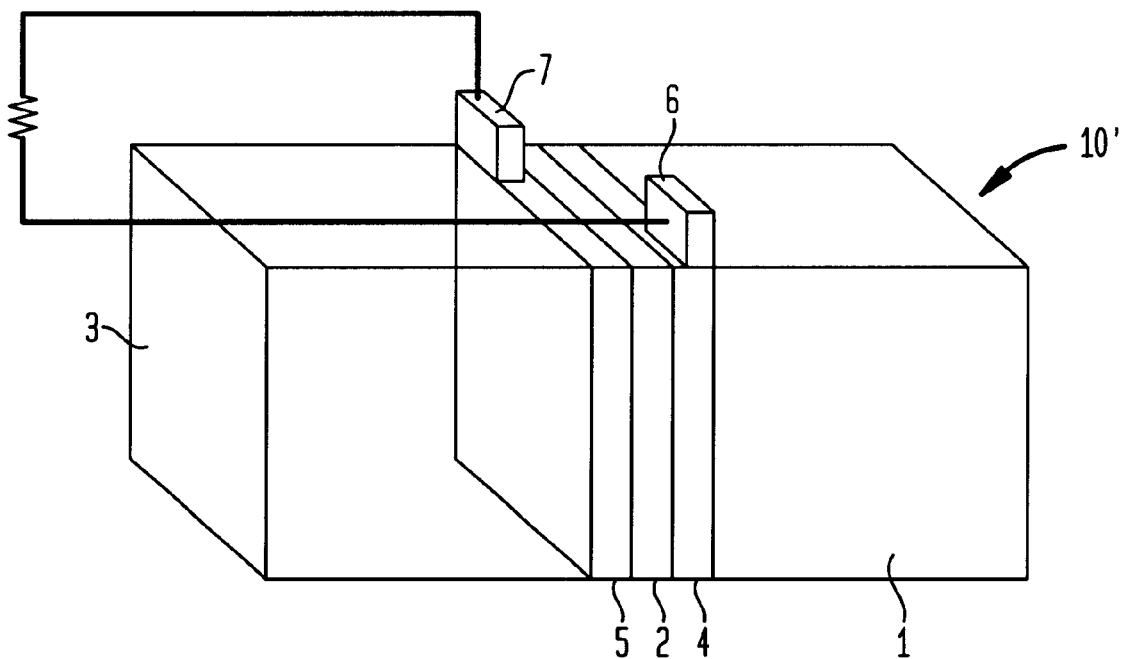
FIG. 1 displays a perspective view of the interior of a fuel cell with three chambers.

FIG. 1 illustrates features of an exemplary battery such as fuel cell 10. The fuel cell has a first chamber 1 containing an electron carrier, with the textured background fill of the first chamber 1 illustrating that the solution can be retained within a porous matrix (including a membrane). Second chamber 2 similarly contains an electrolyte (and can be the same material as found in the first chamber) in a space, which space can also be filled with a retaining matrix, intervening between porous first electrode 4 and porous second electrode 5. A face of second electrode 5 contacts the space of third chamber 3, into which an electron receiving molecule, typically a gaseous molecule such as oxygen, is introduced. First electrical contact 6 and second electrical contact 7 allow a circuit to be formed between the two electrodes.

The optional porous retaining matrix can help retain solution in, for example, the second chamber 2 and minimize solution spillover into the third chamber 3, thereby maintaining a surface area of contact between the electron receiving molecule and the second electrode 5. In some embodiments, the aqueous liquid in the first chamber 1 and second chamber 2 suspends non-dissolved reduced electron carrier, thereby increasing the reservoir of reduced electron carrier available for use to supply electrons to the first electrode 4. In another example, where the chambers include a porous matrix, a saturated solution can be introduced, and the temperature reduced to precipitate reduced electron carrier within the pores of the matrix. Following precipitation, the solution phase can be replaced with another concentrated solution, thereby increasing the amount of electron carrier, which electron carrier is in both solid and solvated form.

It will be recognized that the second chamber can be made up of a polymer electrolyte, such as one of those described above.

The reaction that occurs at the first electrode can be exemplified with NADH as follows:

$$H_2O + NADH \rightleftharpoons NAD^+ + H_3O^+ + 2e^- \quad (3)$$

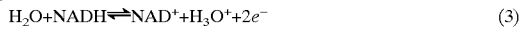

Preferred enzymes relay the electrons to mediators that convey the electrons to the anode electrode. Thus, if the enzyme normally conveys the electrons to reduce a small molecule, this small molecule is preferably bypassed. The corresponding reaction at the second electrode is:

$$2H_3O^+ + 1/2 O_2 + 2e^- \rightleftharpoons 3H_2O \quad (2)$$

Using reaction 2, preferably the bathing solution is buffered to account for the consumption of hydrogen ions, or hydrogen ion donating compounds must be supplied during operation of the fuel cell. This accounting for hydrogen ion consumption helps maintain the pH at a value that allows a useful amount of redox enzymatic activity. To avoid this issue, an alternate electron receiving molecule with an appropriate oxidation/reduction potential can be used. For instance, periodic acid can be used as follows:

$$H_3O^+ + H_5IO_6 + 2e^- \rightleftharpoons IO_3^- + 4H_2O \quad (4)$$

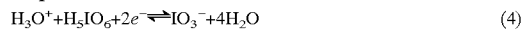

The use of this reaction at the cathode results in a net production of water, which, if significant, can be dealt with, for example, by providing for space for overflow liquid. Such alternative electron receiving molecules are often solids at operating temperatures or solutes in a carrier liquid, in which case the third chamber 3 should be adapted to carry such non-gaseous material. Where, as with periodic acid, the electron receiving molecule can damage the enzyme catalyzing the electron releasing reaction, the second chamber 2 can have a segment, as illustrated as item 8 in fuel cell 10' of FIG. 2, containing a scavenger for such electron receiving molecule.

Figure 3A:
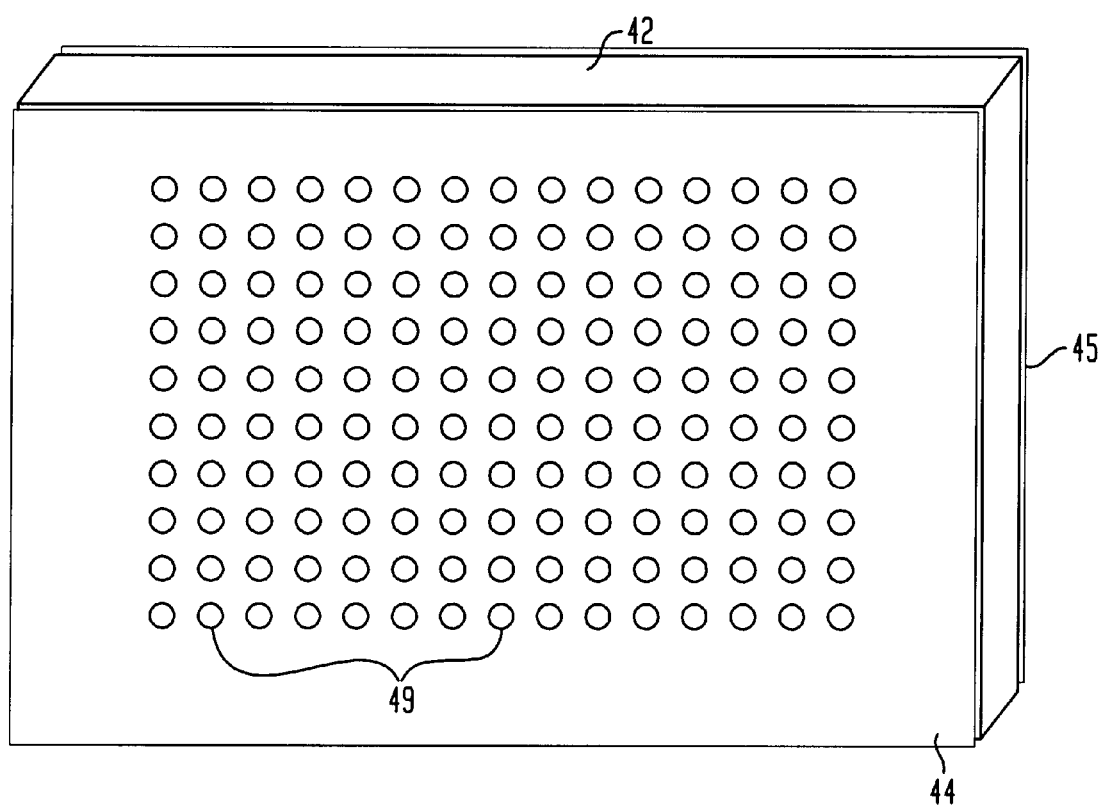

In a preferred embodiment, the electrodes comprise metallizations on each side of a non-conductive substrate. For example, in FIG. 3A the metallization on a first side of dielectric substrate 42 is the first electrode 44, while the metallization on the second side is the second electrode 45. Perforations 49 function as the conduit between the anode and cathode of the fuel cell, as discussed further below. The illustration of FIG. 3A, it will be recognized, is illustrative of the relative geometry of this embodiment. The thickness of dielectric substrate 42 is, for example, from 15 micrometer ($\mu$m) to 50 micrometer, or from 15 micrometer to 30 micrometer. The width of the perforations is, for example, from 20 micrometer to 80 micrometer. Preferably, perforations comprise in excess of 50% of the area of any area of the dielectric substrate involved in transport between the chambers, such as from 50 to 75% of the area. In certain preferred embodiments, the dielectric substrate is glass or an polymer, such as polyvinyl acetate or soda lime silicate.

FIG. 3B illustrates the electrodes framed on a perforated substrate in more detail. The perforations 49 together with the dielectric substrate 42 provide a support for lipid bilayers (i.e., membranes) spanning the perforations. Such lipid bilayers can incorporate at least a first enzyme or enzyme complex (hereafter "first enzyme") 62 effective (i) to oxidize the reduced form of an electron carrier, and preferably (ii) to transport, in conjunction with the oxidation, protons from the fuel side 41 to the product side 43 of the fuel cell 50. Preferably, the first enzyme 62 is immobilized in the lipid bilayer with the appropriate orientation to allow access of the catalytic site for the oxidative reaction to the fuel side and asymmetric pumping of protons. However, as the fuel is substantially isolated on the fuel side 41, an enzyme inserted into the lipid bilayer with the opposite orientation is without an energy source.

Examples of particularly preferred enzymes providing one or both of the oxidation/reduction and proton pumping functions include, for example, NADH dehydrogenase (e.g., from *E.coli*. Tran et al., "Requirement for the proton pumping NADH dehydrogenase I of *Escherichia coli* in respiration of NADH to fumarate and its bioenergetic implications," *Eur. J. Biochem.* 244: 155, 1997), NADPH transhydrogenase, proton ATPase, and cytochrome oxidase and its various forms. Methods of isolating such an NADH dehydrogenase enzyme are described in detail, for example, in Braun et al., *Biochemistry* 37: 1861–1867, 1998; and Bergsma et al., "Purification and characterization of NADH dehydrogenase from *Bacillus subtilis*," *Eur. J. Biochem.* 128: 151–157, 1982. The lipid bilayer can be formed across the perforations 49 and enzyme incorporated therein by, for example, the methods described in detail in Niki et al., U.S. Pat. No. 4,541,908 (annealing cytochrome C to an electrode) and Persson et al., *J. Electroanalytical Chem.* 292: 115, 1990. Such methods can comprise the steps of: making an appropriate solution of lipid and enzyme, where the enzyme may be supplied to the mixture in a solution stabilized with a detergent; and, once an appropriate solution of lipid and enzyme is made, the perforated dielectric substrate is dipped into the solution to form the enzyme-containing lipid bilayers. Sonication or detergent dilution may be required to facilitate enzyme incorporation into a bilayer. See, for example, Singer, *Biochemical Pharmacology* 31: 527–534, 1982; Madden, "Current concepts in membrane protein reconstitution," *Chem. Phys. Lipids* 40: 207–222, 1986; Montal et al., "Functional reassembly of membrane proteins in planar lipid bilayers," *Quart. Rev. Biophys.* 14: 1–79, 1981; Helenius et al., "Asymmetric and symmetric membrane reconstitution by detergent elimination," *Eur. J. Biochem.* 116: 27–31, 1981; Volumes on biomembranes (e.g., Fleischer and Packer (eds.)), in *Methods in Enzymology* series, Academic Press.

Using enzymes having both the oxidation/reduction and proton pumping functions, and which consume electron carrier, the acidification of the fuel side caused by the consumption of electron carrier is substantially offset by the export of protons. Net proton pumping in conjunction with reduction of an electron carrier can exceed 2 protons per electron transfer (e.g., up to 3 to 4 protons per electron transfer). Accordingly, in some embodiments care must be taken to buffer or accommodate excess de-acidification on the fuel side or excess acidification of the product side. Alternatively, the rate of transport is adjusted by incorporating a mix of redox enzymes, some portion of which enzymes do not exhibit coordinate proton transport. In some embodiments, care is taken especially on the fuel side to moderate proton export to match proton production. Acidification or de-acidification on one side or another of the fuel cell can also be moderated by selecting or mixing redox enzymes to provide a desired amount of proton production. Of course, proton export from the fuel side is to a certain degree self-limiting, such that in some embodiments the theoretical concern for excess pumping to the product side is of, at best, limited consequence. For example, mitochondrial matrix proteins which oxidize electron carriers and transport protons operate to create a substantial pH gradient across the inner mitochondrial membrane, and are designed to operate as pumping creates a relatively high pH such as pH 8 or higher. (In some embodiments, however, care is taken to keep the pH in a range closer to pH 7.4, where many electron carriers such as NADH are more stable.) Irrespective of how perfectly proton production is matched to proton consumption, the proton pumping provided by this embodiment of the invention helps diminish loses in the electron transfer rate due to a shortfall of protons on the product side.

Figure 7:
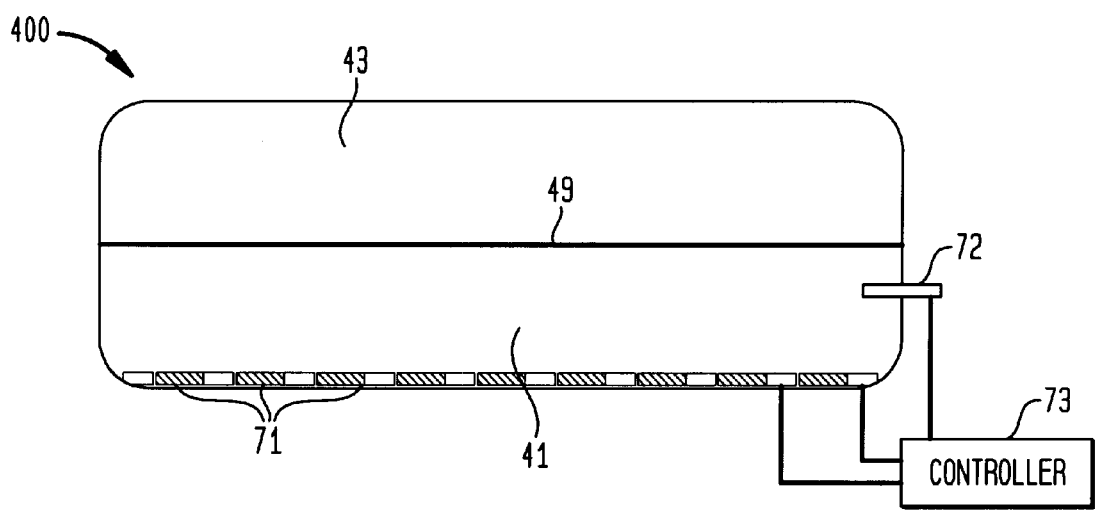
FIG. 7 shows a fuel cell with incorporated light regulation and a sensor.

In some embodiments, proton pumping is provided by a light-driven proton pump such as bacteriorhodopsin. Recombinant production of bacteriorhodopsin is described, for example, in Nassal et al., *J. Biol. Chem.* 262: 9264–70, 1987. All trans retinal is associated with bacteriorhodopsin to provide the light-absorbing chromophore. Light to power this type of proton pump can be provided by electronic light sources, such as LEDs, incorporated into the fuel cell and powered by a (i) portion of energy produced from the fuel cell, or (ii) a translucent portion of the fuel cell casing that allows light from room lighting or sunlight to impinge the lipid bilayer. For example, as illustrated in FIG. 7 is a fuel cell 400 in which light control devices 71 are incorporated. These light control devices 71 contain, for example, LEDs or liquid crystal shutters. Liquid crystal shutters have a relatively opaque and a relatively translucent state and can be electronically switched between the two states. An eternal light source, such as the light provided by room lighting or sunlight can be regulated through the use of liquid crystal shutters or other shuttering device. In some embodiments, the light control devices are individually regulated or regulated in groups to aid in regulating the amount of light conveyed to the proton pump protein. Preferably, the light control devices 71 have lenses to direct the light to focus primarily at the dielectric substrate 42, particularly those portions containing lipid bilayers incorporating the proton pumps. A monitoring device 72 can operate to monitor a condition in the fuel cell, such as the pH or the concentration of electron carrier, and relay information to a controller 73 which operates to moderate an aspect of the operation of the fuel cell should monitored values dictate such action. For example, the controller 73 can moderate the level of light conveyed by the light control devices 71 depending upon the pH of the fuel side 41. Note that in one embodiment an external light source is allowed to energize the proton pump without the use of any light-regulating devices.

In another embodiment, redox enzyme deposited on or adjacent to the first electrode, while a proton transporter is incorporated into the lipid bilayers of the perforations.

In another embodiment, a second enzyme 63 is incorporated into the fuel cell, such as into the lipid bilayer or otherwise on the first electrode or in the first chamber, to facilitate proton transport or generation in the first chamber during recharge mode, thereby adding protons to the fuel side. The second enzyme can be the same as, or distinct from, the enzyme that transports protons during forward operation. An example of this second enzyme include transporting proteins with lower redox potential relative to, for example, NAD succinate dehydrogenase in conjunction with the $CoQH_2$-cyt c reductase complex. Also useful are lactate dehydrogenase and malate dehydrogenase, both enzymes isolated from various sources available from Sigma Chemical Co., St. Louis, Mo. For example, bacteriorhodopsin can also be used with an orientation appropriate for this use in the recharge mode.

In some embodiments, the recharge mode operates to regenerate NADH, but does not reverse pump protons.

The perforations 49 are illustrated as openings. However, these can also comprise porous segments of the dielectric substrate 42. Alternatively, these can comprise membranes spanning the perforations 49 to support the lipid bilayer. Preferably, the perforations encompass a substantial portion of the surface area of the dielectric substrate, such as 50%. Preferably, enzyme density in the lipid bilayer is high, such as $2 \times 10^{12}/mm^2$.

The orientation of enzyme in the lipid bilayer can be random, with effectiveness of proton pumping dictated by the asymmetric presence of substrate such as protons and electron carrier. Alternatively, orientation is established for example by using antibodies to the enzyme present on one side of the membrane during formation of the enzyme-lipid bilayer complex.

The perforations 49 and metallized surfaces (first electrode 44 and second electrode 45) of the dielectric substrate 42 can be constructed, for example, with masking and etching techniques of photolithography well known in the art. Alternatively, the metallized surfaces (electrodes can be formed for example by (1) thin film deposition through a mask, (2) applying a blanket coat of metallization by thin film then photo-defining, selectively etching a pattern into the metallization, or (3) Photo-defining the metallization pattern directly without etching using a metal impregnated resist (DuPont Fodel process, see, Drozdyk et. al. "Photo-patternable Conductor tapes for PDP applications" Society for Information Display 1999 Digest, 1044–1047; Nebe et al., U.S. Pat. No. 5,049,480). In one embodiment, the dielectric substrate is a film. For example, the dielectric can be a porous film that is rendered non-permeable outside the "perforations" by the metallizations. The surfaces of the metal layers can be modified with other metals, for instance by electroplating. Such electroplatings can be, for example, with chromium, gold, silver, platinum, palladium, nickel, mixtures thereof, or the like, preferably gold and platinum. In addition to metallized surfaces, the electrodes can be formed by other appropriate conductive materials, which materials can be surface modified. For example, the electrodes can be formed of carbon (graphite), which can be applied to the dielectric substrate by electron beam evaporation, chemical vapor deposition or pyrolysis. Preferably, surfaces to be metallized are solvent cleaned and oxygen plasma ashed.

As illustrated in FIG. 3C, electrical contact 54 connects the first electrode 44 to a prospective electrical circuit, while electrical contact 55 connects the second electrode 45.

In one embodiment, the product side of the fuel cell is comprised of an aqueous liquid with dissolved oxygen. In an embodiment, at least a portion of the wall retaining such aqueous liquid is oxygen permeable, but sufficiently resists transmission of water vapor to allow a useful product lifetime with the aqueous liquid retained in the fuel cell. An example of an appropriate polymeric wall material is an oxygen permeable plastic. In contrast, the fuel side is preferably constructed of material that resists the incursion of oxygen. The fuel cell can be made anaerobic by flushing to purge oxygen with an inert gas such as nitrogen or helium. In some rechargeable embodiments, the electron-receiving composition is regenerated during recharging mode, thereby eliminating or reducing the need for an outside supply of such electron-receiving composition.

The fuel cell of the invention can preferably be recharged by applying an appropriate voltage to inject electrons into the fuel side to allow the first enzyme to catalyze the reverse reaction. In particularly preferred embodiments, the first enzyme has both the oxidation/reduction and proton pumping functions and operates to reverse pump protons from the product side to the fuel side during recharging. Thus, the reverse pumping supplies the protons consumed in generating, for example, NADH from (i) $NAD^+$ and (ii) the injected electrons and protons. Note that in reverse operation the injected electrons act first to reduce any oxygen resident in the fuel side, as this reaction is energetically favored. Once any such oxygen is consumed, the electrons can contribute to regenerating the reduced electron carrier.

The above discussion of the embodiments using proton transport focus on the use of both faces of a substrate to provide the electrodes, thereby facilitating a more immediate transfer of protons to the product side where the protons are consumed in reducing the electron-receiving composition. However, it will be recognized that in this embodiment structures such as a porous matrix can be interposed between the fuel side and the product side. Such an intervening structure can operate to provide temperature shielding or scavenger molecules that protect, for example, the enzymes from reactive compounds.

The fuel cell operates within a temperature range appropriate for the operation of the redox enzyme. This temperature range typically varies with the stability of the enzyme, and the source of the enzyme. To increase the appropriate temperature range, one can select the appropriate redox enzyme from a thermophilic organism, such as a microorganism isolated from a volcanic vent or hot spring. Nonetheless, preferred temperatures of operation of at least the first electrode are about 80° C. or less, preferably 60° C. or less, more preferably 40° C. or 30° C. or less. The porous matrix is, for example, made up of inert fibers such as asbestos, sintered materials such as sintered glass or beads of inert material.

The first electrode (anode) can be coated with an electron transfer mediator such as an organometallic compound which functions as a substitute electron recipient for the biological substrate of the redox enzyme. Similarly, the lipid bilayer of the embodiment of FIG. 3 or structures adjacent to the bilayer can incorporate such electron transfer mediators. Such organometallic compounds can include, without limitation, dicyclopentadienyliron ($C_{10}H_{10}Fe$, ferrocene), available along with analogs that can be substituted, from Aldrich, Milwaukee, Wis., platinum on carbon, and palladium on carbon. Further examples include ferredoxin molecules of appropriate oxidation/reduction potential, such as the ferredoxin formed of rubredoxin and other ferredoxins available from Sigma Chemical. Other electron transfer mediators include organic compounds such as quinone and related compounds. The electron transfer mediator can be applied, for example, by screening or masked dip coating or sublimation. The first electrode can be impregnated with the redox enzyme, which can be applied before or after the electron transfer mediator. One way to assure the association of the redox enzyme with the electrode is simply to incubate a solution of the redox enzyme with electrode for sufficient time to allow associations between the electrode and the enzyme, such as Van der Waals associations, to mature. Attentively, a first binding moiety, such as biotin or its binding complement avidin/streptavidin, can be attached to the electrode and the enzyme bound to the first binding moiety through an attached molecule of the binding complement.

The redox enzyme can comprise any number of enzymes that use an electron carrier as a substrate, irrespective of whether the primary biologically relevant direction of reaction is for the consumption or production of such reduced electron carrier, since such reactions can be conducted in the reverse direction. Examples of redox enzymes further include, without limitation, glucose oxidase (using NADH, available from several sources, including number of types of this enzyme available from Sigma Chemical), glucose-6-phosphate dehydrogenase (NADPH, Boehringer Mannheim, Indianapolis, Ind.), 6-phosphogluconate dehydrogenase (NADPH, Boehringer Mannheim), malate dehydrogenase (NADH, Boehringer Mannheim), glyceraldehyde-3-phosphate dehydrogenase (NADH, Sigma, Boehringer Mannheim), isocitrate dehydrogenase (NADH, Boehringer Mannheim; NADPH, Sigma), and α-ketoglutarate dehydrogenase complex (NADH, Sigma).

The redox enzyme can also be a transmembrane pump, such as a proton pump, that operates using an electron carrier as the energy source. In this case, enzyme can be associated with the electrode in the presence of detergent and/or lipid carrier molecules which stabilize the active conformation of the enzyme. As in other embodiments, an electron transfer mediator can be used to increase the efficiency of electron transfer to the electrode.

Associated electron carriers are readily available from commercial suppliers such as Sigma and Boehringer Mannheim. The concentrations at which the reduced form of such electron carriers can be as high as possible without disrupting the function of the redox enzyme. The salt and buffer conditions are designed based on, as a starting point, the ample available knowledge of appropriate conditions for the redox enzyme. Such enzyme conditions are typically available, for example, from suppliers of such enzymes.

Figure 4A:
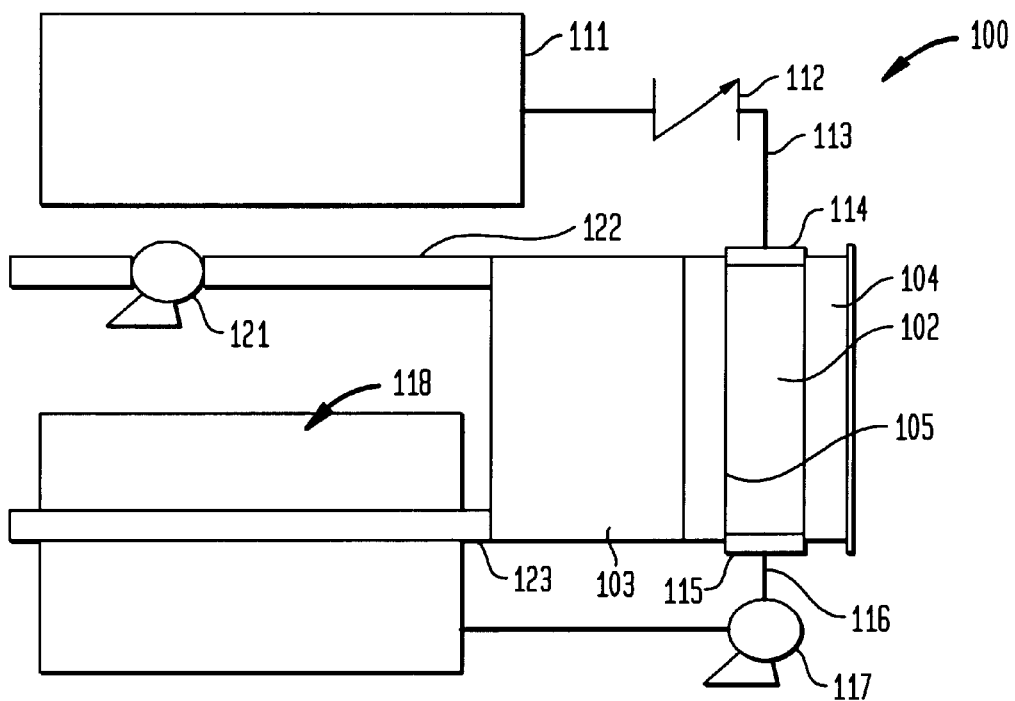
FIGS. 4A and 4B show a top view of a fuel cell with two chambers.
Figure 4B:
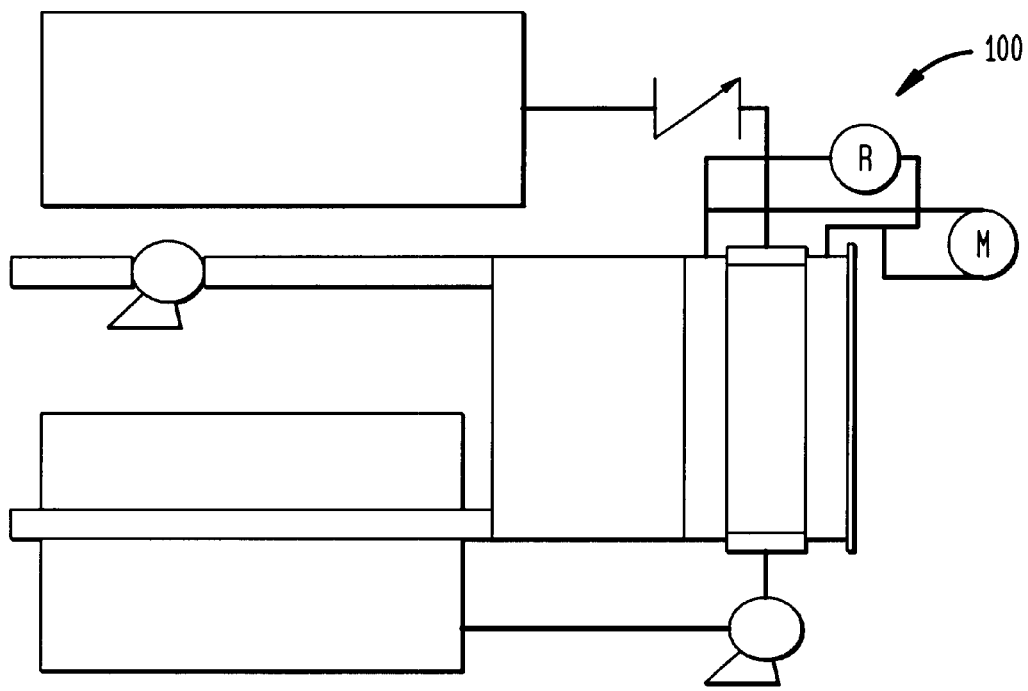

As illustrated for the fuel cell 100 in FIG. 4A (top view), a source reservoir 111 can be provided to supply reduced electron carrier via conduit 113, check-valve 112 and diffuser 114 to second chamber 102. Note that fuel cell 100 lacks a first chamber as this chamber often serves as a reservoir, which in fuel cell 100 is provided by source reservoir 111. Diffuser 115, conduit 116, and pump 117 provide the pathway and motive power for conveying spent liquid containing the electron carrier (often merely having reduced effectiveness in powering the fuel cell) to an output reservoir 118. Fuel cell 100 further has a first electrode 104, second electrode 105, third chamber 103, air pump 121, air inlet 122, and air outlet 123. The various pumps can be operated off of a battery, which can be recharged and regulated using energy from the fuel cell, or can come into operation after the fuel cell begins generating current. As illustrated in FIG. 4B, voltage or current monitor M can monitor the performance the fuel cell in providing voltage to the circuit comprising resister(s) R. Monitor M can relay information to the controller, which uses the information to regulate operation of one or more of the pumps.

Figure 5A:
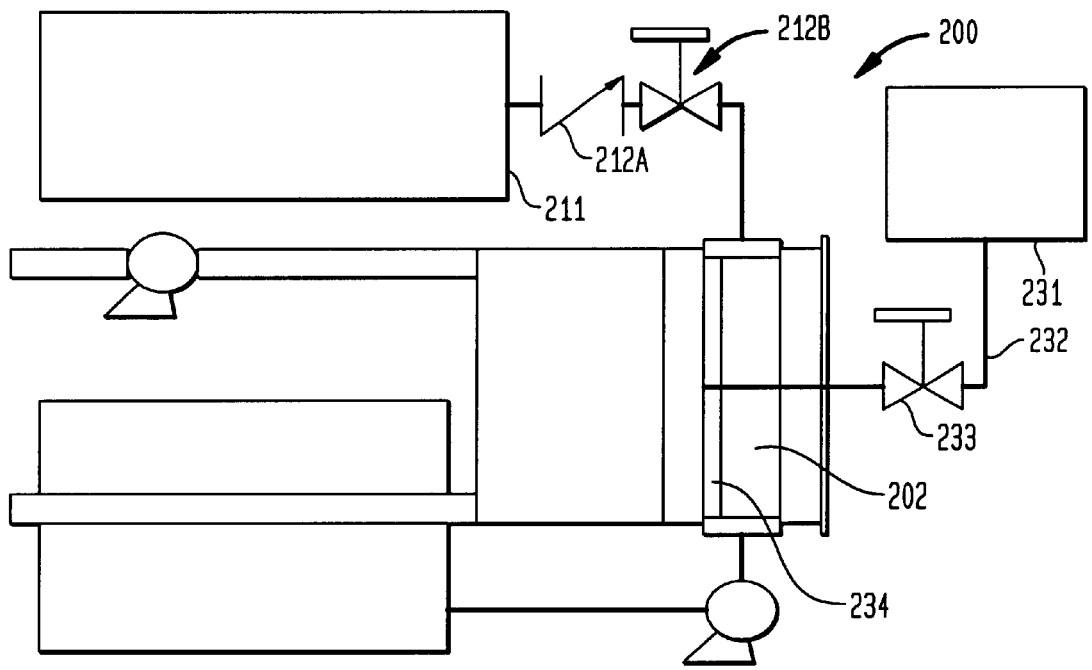
Figure 5B:
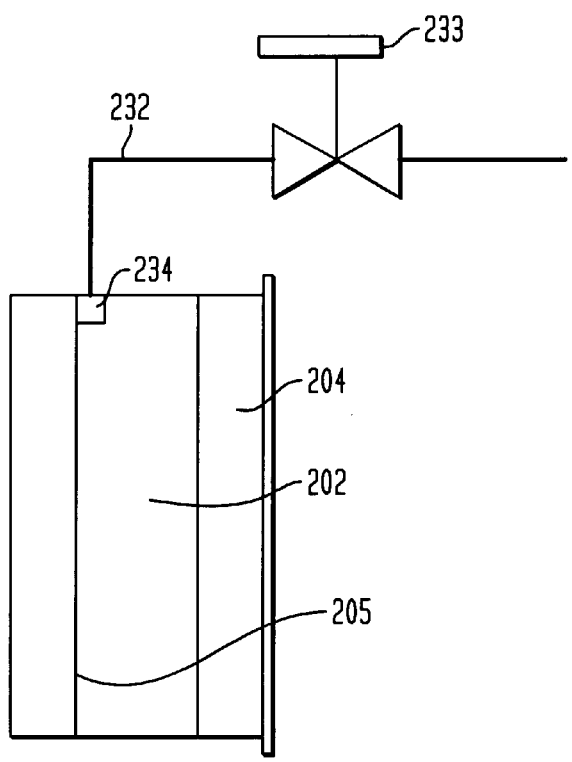
FIG. 5B shows a side view.

FIG. 5A illustrates a fuel cell 200 (top view) in which an acid/base reservoir 231 serves to supply a source of a material required to account for any material imbalances in the reaction equations at the first and second electrodes. The acid/base reservoir 231 is connected via conduit 232, first actuated valve 233, and diffuser 234 to a second chamber 202. Liquid from source reservoir 211 is delivered via check valve 212A and second actuated valve 212B. In one example of operation, second actuated valve 212B is normally open, and first actuated valve 233 is normally closed. These valve positions are reversed when the controller detects the need for fluid from acid/base reservoir 231 (e.g., because of a signal received from a pH monitor) and operates pump 117 (e.g., by use of a stepper motor) to draw fluid into the second chamber 202.

It will be recognized that the pump and valve arrangements in FIGS. 4A through 5B are for illustration only, as numerous alternative arrangements will be recognized by those of ordinary skill. The plumbing of the fuel cell can be arranged to maintain a chamber at less than atmospheric pressure, for instance to help reduce fluid leakage through various porous materials. The pores in various porous materials can be selected to allow such diffusion as is needed while minimizing fluid flow across the porous materials, such as bulk liquid flow into a chamber designed to bring gas into contact with a porous electrode.

Figure 6:
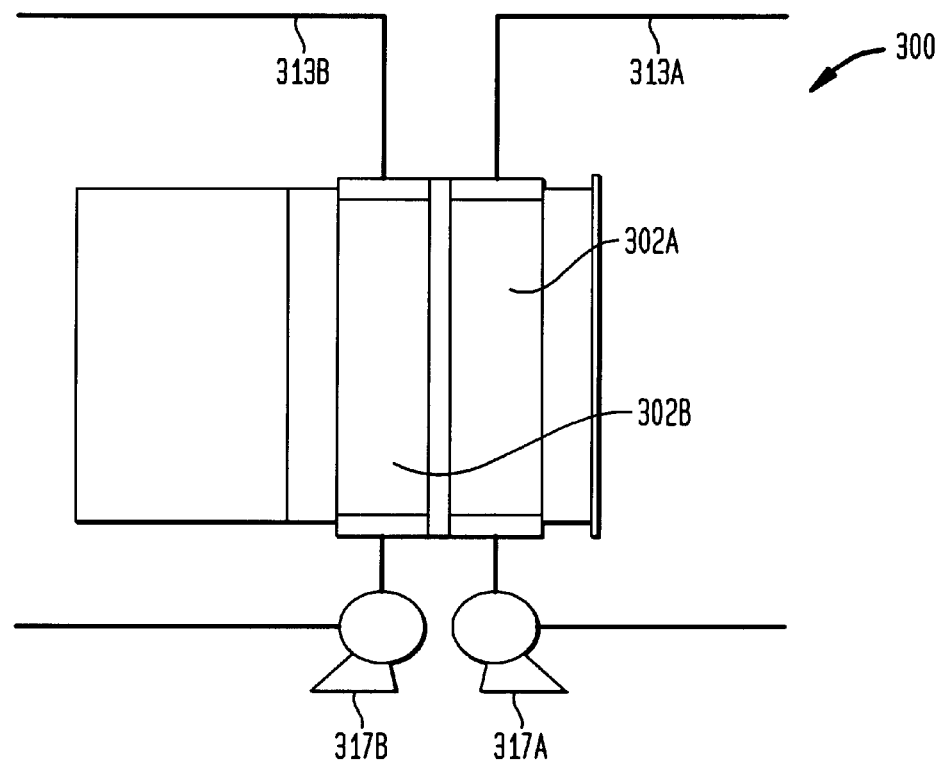
FIG. 6 shows a fuel cell where the fluids bathing the two electrodes are segregated.

The chambers of fluid which the first and second electrodes contact can be independent, as illustrated in FIG. 6. In fuel cell 300, the solution bathing the first electrode (anode) is fed through conduit 313A, while that bathing the second electrode (cathode) is supplied through conduit 313B. Flow is illustrated as regulated by pumps 317A and 317B. In the illustrated fuel cell, the bathing solutions are replenished as needed to account for the necessary imbalance in the chemistries occurring in the segregated cells.

Cells can be stacked, and electrodes arranged in a number of ways to increase the areas of contact between electrodes and reactants. These stacking and arranging geometries can be based on well-known geometries used with conventional fuel cells.

It will be recognized that where the electron carrier has an appropriate electrochemical potential relative to the electron-receiving molecule, the cell can be operated so that the oxidized form of the electron carrier receives the electrons through an enzyme catalyzed event. For example, the electron carrier and the electron-receiving molecule can both be of the class exemplified for electron carriers, but with distinct electrochemical potentials. Thus, both the fuel side and product side reactions can be enzyme catalyzed. In fact, even with such traditional electron-receiving composition as oxygen, the product side reaction can be enzyme catalyzed.

In one embodiment of the invention, the fuel cell does not incorporate a proton pump. Preferably, in this embodiment the redox enzyme is associated with a lipid component, such as a composition containing phospholipid, steroids (such as sterols), glycolipids, sphinoglipids, triglyceride or other components typically incorporated into intracellular or external cellular membranes, while still being sufficiently associated with the electrodes to convey electrons. The enzyme is preferably incorporated into a lipid bilayer. The barrier can be separating component such as is used in a typical fuel cell, which preferably conveys protons between the first and second chambers, though without requiring proton pumping.

The following examples further illustrate the present invention, but of course, should not be construed as in any way limiting its scope.

EXAMPLE

The test apparatus consisted of a 5 ml reaction vessel which held the fuel and into which copper or other electrodes were dipped. The electrodes were in turn connected to a high impedance voltmeter for open circuit voltage measurements or to a low impedance ammeter for short circuit current measurements. Various test configurations were employed to establish a baseline with which to measure performance of the cell. Testing was done by dipping electrodes in the fuel solution and measuring current and/or voltage as a function of time.

The reaction which drove the cell was the oxidation of nicotinamide-adenine dinucleotide hydride (NADH) which is catalyzed by the enzyme glucose oxidase (GOD) in the presence of glucose. This reaction yielded $NAD^+$, a proton ($H^+$) and 2 free electrons.

$$H_2O + NADH = NAD^+ + H_3O^+ + 2e^-$$

The reaction toke place at one electrode, which was a metallized plastic strip coated with the enzyme GOD. This half-reaction was coupled through an external circuit to the formation of water or hydrogen peroxide from protons, dissolved oxygen, and free electrons at the other electrode.

Fuels used were solutions of glucose, NADH or combinations thereof distilled deionized water or a 50 mM solution of Tris™ 7.4 buffer. (NADH is most stable in a pH 7.4 environment.) Electrode materials were copper (as a reference) and metallized plastic strips coated with GOD (a commercially available product).

Test configurations employed as well as initial results were as follows:

Configuration 1:
  Electrode 1: Copper
  Electrode 2: Copper
  Solution: 50 mM tris 7.4 buffer
  Voltage: −7.5 mV
  Current: 3 μA initially decaying to −2.2 μA within 3 minutes, fairly constant thereafter.
Configuration 2:
Electrode 1: Copper
  Electrode 2: GOD coated strip
  Solution: 50 mM tris 7.4 buffer
  Voltage: +350 mV
  Current: >20 μA (+) initially decaying to +4 μA within 2 minutes, fairly constant thereafter.
Configuration 3:
  Electrode 1: Copper
  Electrode 2: Copper
  Solution: 10 mM glucose in 50 mM tris 7.4 buffer
  Voltage: −6.3 mVCurrent: −1.7 μA, fairly constant after initial dropoff.
Configuration 4:
  Electrode 1: Copper
  Electrode 2: GOD coated strip
  Solution: 10 mM glucose in 50 mM tris 7.4 buffer
  Voltage: +350 mV
  Current: >20 μA (+) initially decaying to ~+2 μA within 2 minutes, fairly constant thereafter.
Configuration 5:
  Electrode 1: Copper
  Electrode 2: Copper
  Solution: 10 mM glucose+10 mM NADH in 50 mM tris 7.4 buffer
  Voltage: −290 mV slowly increasing to −320 after 4 minutes
  Current: −25 μA, decaying to −21 μA after 2 minutes.
Configuration 6:
  Electrode 1: Copper
  Electrode 2: GOD coated strip
  Solution: 10 mM glucose+10 mM NADH in 50 mM tris 7.4 buffer
  Voltage: +500 mV decaying to +380 after 2 minutes
  Current: >+30 μA, dropping rapidly to ~+1 μA after 1 minute.

All publications and references, including but not limited to patents and patent applications, cited in this specification are herein incorporated by reference in their entirety as if each individual publication or reference were specifically and individually indicated to be incorporated by reference herein as being fully set forth. Any patent application to which this application claims priority is also incorporated by reference herein in its entirety in the manner described above for publications and references.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

Appendix I

As stated in Landry et al., "Purification and Reconstitution of Epithelial Chloride Channels," 191 *Methods in Enzymology* 572 (1990), at pages 581–2:

Reconstitution of Chloride Channel Proteins into Planar Bilayers

The concentrated purified channel proteins are added to 10 mg of asolectin and 9 mg of N-octylglucoside, vortexed, placed in a dialysis tube (Spectra-por, $M_r$ 14,000 cutoff), and dialyzed against 1 liter of 10 M KCl/700 mM sucrose/10 mM HEPES titrated to pH 7.0 with KOH for 15 hr. The dialysate is changed and dialysis continued for an additional 3 hr. Vesicles are stored on ice until use.

Planar bilayers (4% asolectin in decane) are formed by the brush technique in a 100 μm hole {A. Finkelstein, this series [Methods in Enzymology], Vol. 32, p. 387} in a Teflon partition. Vesicles are squirted at the membrane through a micropipet positioned 20–50 μm from the planar bilayer {M. H. Akabas et al., *J. Cell. Biol.* 98, 1063 (1984)}. The cis (vesicle-containing) chamber has a buffer of either 350 mM KCl/10 mM CaCl2/10 mM HEPES/pH 7.0 with KOH or 150 mM KCl/400 mM urua/2-mM hemicalcium gluconate/10 mM HEPES/pH 7.0 with KOH. The trans side contains a similar buffer with either 100 mM KCl or 10 mM KCl but without urea. The single-channel currents are amplified with a home-made current-to-voltage converter and amplifier and recorded on a PCm-video tape recorder (Indec Systems, Inc., Sunnyvale, Calif.). The data are digitized and analyzed using interactive programs on a laboratory computer system (Indec Systems). Records are filtered at 300 Hz prior to digitization through an 8-pole Bessel filter (Frequency Devices). Potentials given are those in the cis chamber relative to virtual ground in the trans chamber.

As stated in Schindler, "Planar Lipid-Protein Membranes . . . ," 171 *Methods in Enzymology* 225 (1989), at pages 225–39:

Strategies to Form Planar Lipid Membranes

Molecular understanding of ion channel function involves assignment of channel transport activities to constituents, to their arrangements, and to membrane conditions. One major strategy for identifying such structure-function relationships is to reconstitute isolated channel proteins into planar lipid membranes. From the different approaches used in the past (see reviews by Montal et al. {*Q. Rev. Biophys.* 14, 1 (1981)} and by Miller {*Physiol. Rev.* 63, 1209 (1983)}) two principal strategies have emerged. They both use lipid-protein vesicles as starting material, either native membrane vesicles or reassembled lipid-protein vesicles. In the first strategy {Miller and Racker, *J. Membr. Biol.* 30, 283 (1976) }, vesicle-bilayer fusion (VBF)[1] vesicles are fused to preformed planar lipid membranes. Transfer of channel proteins from vesicles to planar membranes by this method requires the presence of calcium ions, of osmotic gradients across the vesicles and the planar membrane, and of negatively charged lipids. In the second strategy, planar bilayers are formed from vesicles {Schindler, *FEBS Lett.* 122, 77 (1980)}. The technique is based on the finding that monolayers spontaneously form at the air-water interface of any vesicle suspension {Pattus et al., *Biochim Biophys. Acta* 507, 62 (1978); Schindler, *Biochim. Biophys. Acta* 555, 316 (1979); Schürholz et al., *Eur. Biophys. J.* (in press)}. There are two distinct ways of combining two such monolayers (normally one lipid-protein and one lipid monolayer) to form a bilayer. In the first method, the monolayers are apposed within an aperture in a thin Teflon septum {Schindler, *Biochim. Biophys. Acta* 555, 316 (1979)} [septum-supported vesicle-derived bilayer (SVB)]. By raising the water levels in both compartments above the aperture, the two monolayers cover the Teflon septum and combine to a bilayer within the aperture, in close analogy to bilayer formation from solvent spread monolayers at lens pressure {Montal et al., *Proc. Natl. Acad. Sci. U.S.A.* 69, 3561 (1972)}. In the alternate method, the support is not a septum between the two monolayers but a glass pipet used to bring two monolayers into bilayer contact [pipet-supported vesicle-derived bilayer (PVB)] {Wilmsen et al., in "Physical Chemistry of Transmembrane Ion Motions" (G. Spach, ed.), p. 479. Elsevier, Amsterdam, 1983; Schürholz et al., *FEBS Lett.* 152, 187 (1983); Coronado et al., *Biophys. J.* 43, 231 (1983)}.

[1] Abbreviations and symbols: VBF (Vesicle-bilayer fusion): technique to incorporate lipid-protein vesicles into preformed planar lipid bilayers. SVB (Septum-supported vesicle-derived bilayer): technique to form planar membranes from lipid-protein vesicles. PVB (Pipet-supported vesicle-derived bilayer): technique to form lipid-protein bilayers at the tip of a glass micropipet. PC, Patch-clamp technique; $A_{bil}$, area of bilayer, set equal to the area of the aperture in the Teflon septum within which the bilayer is formed according to the SVB technique—i.e., $A_{bil}=\pi d^2/4$, where d is the diameter of the aperture; $N_L$, number of lipids per vesicle; $N_{v,b}$ relates molar ratio of protein to lipid in the bilayer, $(p/l)_{bil}$, to that in the vesicles, $(p/l)_{ves}$, used to form the bilayer—i.e., $\eta_{v,b}=(p/l)_{bil}/(p/l)_{ves}$; $\pi_e$, vesicle monolayer equilibrium surface pressure, used to assay the lateral pressure in the planar bilayer; $n_s$, number of proteins per unit area of bilayer; $t_c$, average time for first collisions of proteins in planar bilayers, initially distributed at random; $D_{lat}$, lateral diffusion of membrane proteins.

{FIG. 1 (omitted) shows:} Schematic diagram of strategies to form planar lipid-protein membranes. Straight arrows indicate that the membrane material is transformed from one configuration to another. The curved arrow indicates combination or "fusion" of two configurations of vesicles to a preformed planar bilayer. Abbreviations and references: VBF {Miller et al., *J. Membr. Biol.* 30, 283 (1976)}, vescile-bilayer fusion; SVB {H. Schindler, *FEBS Lett.* 122, 77 (1980)}, septum-supported, vesicle-derived bilayer; PVB {Wilmsen et al., in "Physical Chemistry of Transmembrane Ion Motions" (G. Spach, ed.), p. 479. Elsevier, Amsterdam, 1983; Schürholz et al., *FEBS Lett.* 152, 187 (1983); Coronado et al., *Biophys. J.* 43, 231 (1983)}, pipet-supported, vesicle-derived bilayer. The patch clamp (PC) {Hamill et al., *Pfluegers Arch.* 391 (1981)} has been included, because it porvides reference data for reconstitution by either the VBF method or the SVB or PVB methods, where viesicles are used as starting materials in all three techniques.

Both strategies, vesicle—bilayer fusion and vesicle-derived bilayers, have yielded satisfactory recovery of channel functions for several different channels, starting from isolated proteins. Comparison of channel characteristics obtained from patch clamp (PC) studies {Hamill et al., *Pfluegers Arch.* 391 (1981)} on whole cells and reconstitution data allowed for clear identification of particular protein species as primary constituents of electrophysiologically observed channel conductances. Further structure—function assignments via reconstitution would require at least some knowledge of physical and structural conditions in the membrane while observing channel activities. More specifically, it would be desirable to relate channel conductances (1) to the number and stoichiometry of components; (2) to their lateral and transverse distributions, such as modes of association; and (3) to variables characterizing the overall physical state of the membrane. Channel reconstitution based on physical control of bilayers needs further study. The vesicle-bilayer fusion method is not particularly suited for this, since number, arrangement, and environmental conditions of inserted channel proteins are not sufficiently known to infer relationships between membrane structure aspects and observed channel properties. The second principal strategy, vesicle-derived bilayers, has been implemented for the control of at least a few basic structural parameters of planar membranes containing channel proteins. It is the goal of this chapter to give a detailed account of how structural control is achieved in SVB, with all necessary technical information to build a planar bilayer stand, to form SVB, and to analyze channel conductances under variable conditions, with references given to published examples.

Experimental Setup
Electrical Equipment

Figure 2:
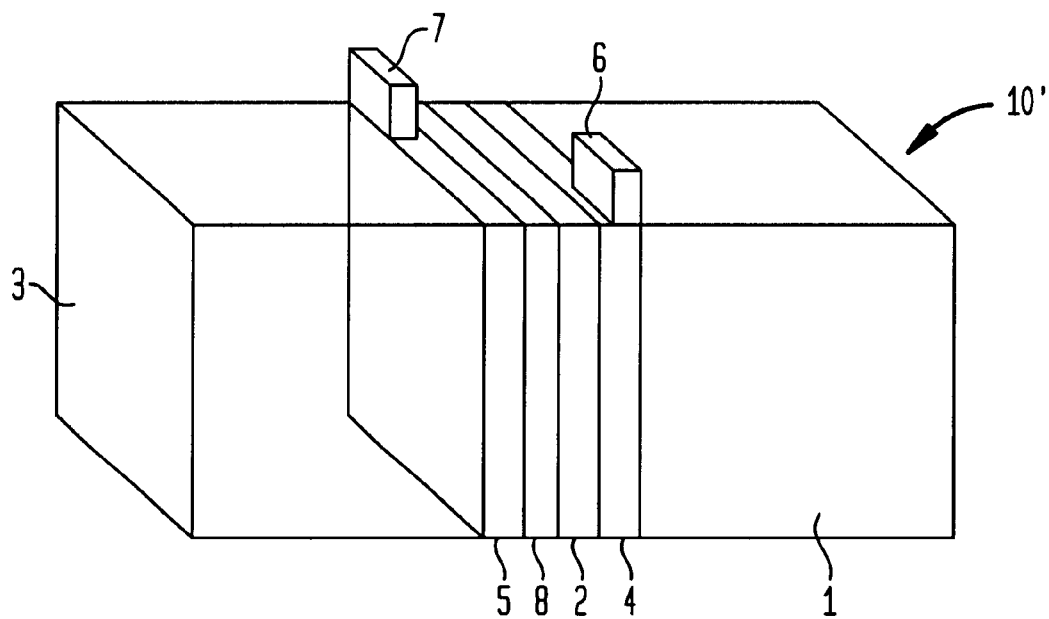
FIG. 2 illustrates a fuel cell exhibiting certain preferred aspects of the present invention.

As schematically shown in FIG. 2 (omitted), one compartment of the bilayer cell (cf. FIG. 4, omitted) is connected to an input source and the other compartment to an amplifier (current-to-voltage converter). Different types of input signals are used, dc, sine, and ramp. A dc signal of high stability is absolutely required (A circuit diagram of a simple, low-cost battery-driven dc source is shown in FIG. 7a (omitted). Its noise is sufficiently low, and voltage values can be conveniently changed between preset values.) A sine wave, 50 Hz and 16 mV peak to peak, is used to monitor membrane formation. For this purpose, sine waveform distortions and noise are of no importance, so that it is sufficient to simply transform line power as shown in FIG. 7b (omitted). The amplifier (FIG. 7c, omitted) is also easy to build using the particular elements given in Appendix I-A. A voltage ramp signal is not absolutely required, but is convenient for monitoring current—voltage relations of channel conductances. A simple scheme to generate triangular waveforms is described in Ref. 13, p. 120, with additional information on electrical equipment for planar bilayer work, including fabrication of the Ag—AgCl electrodes {Alvarez, in "Ion Channel Reconstitution" (C. Miller, ed.), p. 115. Plenum, N.Y. 1986}. The other devices in FIG. 2 (omitted) are standard commercial units. The low-pass filter, normally an 8-pole Bessel filter, should have settings of (1 and 3)×10 Hz, for n=0, 1, 2, and 3. A digital storage scope with rolling data mode is of advantage. The chart recorder is used only to continuously protocol experiments, so any simple one-channel recorder may be used. The nonfiltered data are stored on tape. There are two possibilities. The expensive version employs a FM four-channel tape recorder (up to 40 kHz resolution) such as from RACAL Ltd., Southampton, England, type store 4D. It has the advantage that data can be replayed at up to 64 times slower speed. The other version employs any video recorder with a processor that can be modified to accept dc signals. Its resolution is even higher than that of the FM tape recorder, and its dynamic range is just appropriate (up to 10 kHz). Unfortunately, there is no version yet on the market which allows for replay slower than real time. This, however, may not be a serious disadvantage if a data processing unit is used which can store channel data in real time. One of the less expensive versions, but well adapted in its software for bilayer work, is the B-Scope offered by med-NATTC (Munich, Germany). The +15 and -15 V supply for the amplifier is provided by 20 long-life batteries with 1.5 V each, assembled in a box within the Faraday cage. For stirring we use two small magnets, one for each compartment, fixed to the axes of two small motors, which can be separately regulated by an external unit to revolutions in the range of 1 to 10 Hz.

{FIG. 2 (omitted) shows:} Electrical equipment for planar bilayer reconstitution work CELL: planar bilayer cell with two electrodes, one connected to the voltage INPUT SOURCE (DC, SINE, or RAMP) and the other connected to a current-voltage converter (AMPL) supplied with voltage by batteries (BAT). The output signal from the amplifier is connected to a storage scope (STOR. SCOPE) via a low-pass filter (LP FILTER), to a chart recorder (CHARTREC.), and to a tape recorder (TAPEREC.) for later processing of data (DATA PROC.). STIRR: stirring magnets, one for each compartment of the bilayer cell.

Mechanical Parts

The mechanical hardware of the bilayer stand we use is shown in FIG. 3 (omitted). Dimensions are not critical and may be estimated from FIG. 3, except for the bilayer cell and Teflon septum, which are described in FIGS. 4a and 8 (omitted), respectively. The shock table consists of a framework of rectangular steel tubing on four shock feet (used for workshop machines of similar weight). A wooden plate (70×70 cm) is tightly screwed to the steel stand. The top plate is of iron (90 kg), which rests on three rubber stoppers.; The iron and wooden plates each have a circular hole (see FIG. 3b (omitted)) of about 6 cm in diameter for installment of the stifling motors and magnets. The two magnets are positioned below the two compartments of the bilayer cell and vertically just below the bottom plate of the Faraday cage. The motors are in a plastic holder which is fixed from below the wooden plate. The Faraday cage is made from 2-mm sheet iron and has a sliding door at the front and BNC input-output connections at the rear. The cage should be tightly fixed to the iron plate. Inside the cage (see FIG. 3b (omitted)) are the battery box (at the rear), a solid holder for the electrodes, and the amplifier box (small cylindrical part at the front, right side). The holder is worked from a brass pipe (10 cm in diameter, 6-mm wall thickness, and 15 cm in length). Its lower rim fits exactly to the cell holder, so that there is no play when the amplifier and electrode holder are lowered (compare FIG. 3c and d (omitted)). The bilayer cell consists of two half-cells, between which the Teflon septum is positioned. They are clamped together by a tapered metal ring and tightened by hand. For the type of septum used, this gives reliable electrical tightness.

{FIG. 3 (omitted) shows:} Photographs showing mechanical parts of a planar bilayer stand. (a) Faraday cage (F), iron plate (I), wooden plate (W), steel stand (S), and shock feet (SF). (b) Sliding door (SD), battery box (B), holder (H) for amplifier (A) and electrodes (E), stirring magnets (SM), half-cell (HC), metal ring (MR), and cell holder (CM). (c) Amplifier (A), electrodes (E), syringes (SY) with teflon tubings (In inserted into the two compartments, and pipet (P) with a special glass tip and vial (V) for vesicle suspension. (d) Amplifier and electrode holder in raised position.

The critical aspects of the whole design are the shape of the compartments in the Teflon cell (addressed in the legend to FIG. 4 (omitted)), fabrication of the Teflon septum (described in Appendix I-B), but especially the punching of the aperture within which the planar bilayers are to be formed. Because we know that success in bilayer work depends on the septum and aperture, and that fabrication is not trivial even for a good machine shop, we have decided to offer some help for those who want to use this technique (see last section, Start-Up Kit for Users).

{FIG. 4 (omitted) shows:} (a) Drawing of the assembly of a bilayer cell. Dimensions: compartments are 16 mm deep and 12 mm in diameter. The commonhold of the half-cells is 4 mm in diameter; its center is 9 mm above the bottom of each compartment. The height of the Teflon cell is 20.5 mm. Upper and lower outer diameters of the tapered Teflon cell are 32.5 and 35.5 mm, respectively. Each half-cell has one 2-mm hole from the top surface to the bottom of the compartment (not shown) for insertion of the Teflon tubing, which is connected to a syringe used to add vesicle suspension to each compartment The tapered metal ring is 18 mm high; the outer diameter is 48 mm and the inner diameters are 33 and 35 mm at the upper and lower ends, respectively. The common hole (4 mm in diameter) should enlarge in a smooth curvature to join the compartments without edges. Dimensions of the Teflon septum are given in FIG. 8 (omitted). (b) Schematic illustration of three states during planar bilayer formation. State 1 (left): vesicles have just been added. State 2 (middle): monolayers have spontaneously formed from vesicles. State 3 (right): a planar bilayer has been formed by raising the water levels, thus apposing the two monolayers within the aperture in the Teflon septum (for details and mechanism see the text).

(c) Electrical capacitance signal during bilayer formation (see the text).

Principle of Planar Membrane Formation from Vesicles

This technique {Schindler, *FEBS Lett.* 122, 77 (1980)} makes use of physical forces {Schindler et al., *Eur. Biophys. J.* (in press)} leading to spontaneous (re)organization of membrane material at interfaces and between interfaces. During membrane reorganization, three distinct situations lead to formation of planar membranes from vesicles, shown schematically as three bilayer cells in FIG. 4b (omitted). In the first situation, vesicle suspensions have been added to the two compartments of the bilayer cell to just below the aperture (cf. FIG. 4a (omitted) for details). In the second situation a spontaneous process occurs in the bilayer cell, the self-assembly of lipid—protein mono-layers at the interfaces {Pattus et al., *Biochim. Biophys. Acta* 507, 62 (1978); Schindler, *Biochim. Biophys. Acta* 555, 316 (1979); Schürholz et al., *Eur. Biophys. J.* (in press)}. Typically within 10 sec the surface pressure approaches its equilibrium value {Schindler, *Biochim. Biophys. Acta* 555, 316 (1979)}, characteristic for the lipids and aqueous phases used. Monolayer compositions closely mimic those of the overall vesicle suspensions {Schürholz et al., *Eur. Biophys. J.* (in press)} just after monolayer formation. The two monolayers, being in equilibrium with membranes, spontaneously (re)combine with a membrane when they are apposed within the aperture, after raising the water levels above the aperture (the third bilayer cell). The whole procedure takes about 1 min.

Appropriate Vesicle Suspensions

Spontaneous formation of monolayers and recombination of two monolayers to a bilayer impose certain constraints on vesicle samples to be used for planar bilayer formation. They all relate to the equilibrium pressure, $\pi_e$, which should be reached for successful bilayer formation. Depending on the type of lipid used and on the type and strength of ions in solution, measured $\pi_e$ values range between about 20 and 45 mN/m {H. Schindler, unpublished observations (1988)}. Bilayer formation becomes impracticable for $\pi_e$ values below 24 mN/m. For practical purposes of bilayer formation, however, it is not required to know or measure the $\pi_e$ value of the vesicle sample used. The surface pressure will adjust to the proper $\pi_e$, value provided the following conditions are fulfilled.

1. Vesicle diameter should exceed 100 nm. For smaller vesicles of the same composition, considerably lower "apparent" $\pi_e$ values are measured {Schindler, *FEBS Lett.* 122, 77 (1980)}, reflecting an unfavorable energy state due to limited size (caused by energy input, such as sonication, during vesicle preparation). Therefore, vesicle preparation methods should be used which require little mechanical or chemical energy input, yielding vesicles larger than 100 nm (for techniques, see Appendix I-C). The time approach to $\pi_e$ should be sufficiently fast (up to 1 min) for the purpose of bilayer formation.

2. Vesicle concentration should be about 1 mg lipid/ml {Schindler, *FEBS Lett.* 122, 77 (1980)}. Although $\pi_e$ is independent of vesicle concentration {Schindler, *Biochim. Biophys. Acta* 555, 316 (1979)}, the approach to $\pi_e$ becomes controlled by diffusion flux of vesicles to the surface when vesicle concentration is, for example, below 0.3 mg/ml for vesicles 120 nm in diameter.

3. Buffers should contain at least 10 mM univalent ions or at least 1 mM calcium or magnesium ions. At lower concentrations, electrostatic barriers, especially when using negatively charged lipids, impede mono-layer formation {Schindler et al., *Eur. Biophys. J.* (in press)} (see below).

4. The following restriction is more severe. It was found {Schindler et al., *Eur. Biophys. J.* (in press)} that pure lipid vesicles (with protein or proteolipid impurities less than $10^{-5}$ mol per mole lipid) do not spread to monolayers or do so only extremely slowly. However, when only one protein or proteolipid is present per vesicle (about $10^5$ lipids), the monolayer formation rate increases by orders of magnitude to values practical for bilayer formation. Therefore, when using very pure synthetic lipids we add trace amounts of proteolipid isolated from soybean lipid {Schindler et al., *Eur. Biophys. J.* (in press)} to facilitate monolayer formation. Commercially available lipids, obtained from lipid extracts, have thus far yielded sufficiently fast monolayer formation, probably due to residual nonlipid components.

5. Considerable vesicle aggregation should be avoided, because the presence of aggregates reduces monolayer formation rates. This is interpreted in the following way. Analysis of vesicle-monolayer equilibration showed {Schindler, *Biochim. Biophys. Acta* 555, 316 (1979)} that equilibration of the system can be regarded as a sequence of preequilibration steps between monolayer and individual vesicles (net flow of a few lipid molecules from the vesicle outer layer has adjusted to that of lipids in the monolayer). There are many more such elementary steps of lipid flow required for system equilibration (zero net flow) than even one densely packed layer of vesicles could provide, so that preequilibrated vesicles have to make room for vesicles which have not yet interacted. Aggregates, however, tend to adhere more strongly to the region below the monolayer than do single vesicles, due to increased van der Waals forces, and therefore impede the final approach to system equilibrium, so that the monolayer pressure remains stationary at a value below the equilibrium value $\pi_e$. When membranes are not associated with aggregates of single-walled vesicles but with oligolamellar vesicles, reduction of monolayer formation rates is also found, but only by a factor of 2 to 3. It should be added that adhesion is generally strengthened by high salt concentrations, such as 1 M KCl. Minimizing adverse effects of adhesion and satisfying aspect (3) above leaves an optimal salt range of 100 to 200 mM univalent salt.

Protocol for Planar Membrane Formation
Preparatory Procedures

1. Vesicle samples. For one set of experiments prepare about 20 ml of lipid-vesicle suspension at 1 mg/ml (see Appendix I-C). For bilayers asymmetric with respect to lipid, two such samples are prepared. Two glass vials (shown in FIGS. 3c or d (omitted)) are filled with 2 ml of suspension, one vial for the rear and one for the front compartment of the bilayer cell. Lipid-protein vesicles, prepared by dialysis or the fast dilution technique (Appendix I-C), are added in a defined aliquot to one of the vials and are mixed by shaking. The vials should be sterilized before use and used only once.

2. Ag—AgCl electrodes (stored in distilled water) are connected to the amplifier holder.

3. A Teflon septum with optional aperture diameter (we use apertures of 160, 100, 80, or 60 µm, depending on application) is briefly sonicated in a bath in chloroform-methanol-water (2:1:3), washed in distilled water, and stored dry between Kleenex sheets.

4. The cell: For one bilayer setup, or for each project, at least six cells should be available. They are recycled by cleaning in warm 1% detergent solution with stirring inside the compartments for 2 hr, followed by the same procedure with several washes in distilled water, and stored in a dust-tight box. It is advisable to take a fresh cell for any change of conditions. Before reusing the same cell it should be rinsed with water by repeatedly fling with water and clearing by aspiration (no hydrocarbon solvents should be used for cleaning, because their evaporation is slow from the capillary Teflon surfaces, and they may partition into the lipid-protein monolayer during the next experiment).

5. For addition of vesicle suspensions to the compartments, two syringes and two pipets are used (see FIGS. 3c and d (omitted)). The former are assembled from sterile 1-ml syringes, 1-mm (o.d.) hypodermic needles, and Teflon tubing about 8 cm long (all used as disposable elements). The Teflon tubing has been cleaned inside and outside by a flush of detergent solution and distilled water, each for 2 hr. Tubing is stored in a dust-tight box with one end sticking out. Fixed 200-µl capillary glass pipets with a Teflon-tipped plunger are used as pipets. Glass capillaries are pulled to small openings to deliver smaller droplets; the pulled part (~2 cm in length) is bent by about 30° for comfortable delivery of droplets to the compartments (see below). These capillaries may be reused after cleaning in hexane when dry and dust-free.

6. For septum coating use hexadecane in hexane (5 µl/ml) in an absolutely clean small glass vial with an air-tight Teflon cover. A capillary glass pipet with one end pulled to a small opening is used to apply this solution to the septum (see note 5 above). A closed-end rubber tube is fixed to the other end of the capillary tube and is used for filling the glass tube and for delivering tiny droplets. This pipet should be carefully cleaned in hexane before loading with hexadecane solution.

7. For monitoring planar bilayer formation a sine wave input voltage is applied. The output signal, $V_{out}$, is then related to the input, $V_{in}$, by $$V_{out} = R_f(V_{in}/R_m + CdV_{in}/dt)$$

with $V_{in} = \frac{1}{2}V_{p-p}$ in sin $2\pi v t$. At a sine wave frequency $v=50$ Hz, the capacitive current $[C(dV_{in}/dt)]$ is larger by orders of magnitude than the noncapacitive current ($V_{in}/R_m$) even in the presence of several open channels. Under this assumption the peak-to-peak output voltage is $$V_{p\text{-}p\ out} \approx R_f V_{p\text{-}p\ in} 2\pi v C$$

for $R_m \gg (2\pi v C)^{-1}$. There are three distinct stationary states of the output signal, referred to as $S_{sep}$, $S_{bil}$, and $S_{sat}$.

$S_{sep}$ is the capacitive current contribution of the septum. The septum is about half-covered by the aqueous phases during bilayer formation, corresponding to capacitance values of 30 and 15 pF for the two Teflon thicknesses used, 6 and 12 $\mu$m, respectively. Example: $S_{sep}=1.5$ V for $R_f=10^{10} \Omega Q$, $V_{p\text{-}p\ in}\ 2\pi=100$ mV, v=50 Hz, using 6-$\mu$m-thick Teflon.

$S_{bil}$ is the capacitive current across the completely formed planar lipid bilayer, including $S_{sep}$. Bilayer capacitance is proportional to bilayer area ($A_{bil}$):

$$C_{bil}=C_{spec}A_{bil}$$

Example: $S_{bil}=9$ V for the same values as in the above example, and for 160-$\mu$m aperture size and $C_{spec}=0.75$ $\mu$F/cm$^2$ (value for soybean lipid bilayer). $C_{bil}=150$ pF (it would be 20 pF for a 60-$\mu$m aperture). Capacitive resistance $(2\pi v C)^{-1}$ is $2\times 10^7 \Omega$.

$S_{sat}$ is the current across the aperture when the membrane is broken which is always high enough to drive the amplifier into saturation.

Step-by-Step Guide for Bilayer Formation

Step 1. Using a capillary pipet, a tiny droplet (~0.5 $\mu$l) of the hexadecane solution is placed on the septum at the aperture. The droplet will spread to some extent (it should not roll away from the aperture, indicating adverse surface properties of this particular septum) yet and should cover the hole during hexane evaporation. This is repeated on the other side of the septum (the droplets should not flow through the hole, which again would indicate inappropriate surface conditions on the Teflon; if this occurs after washings, the septum should be discarded). To remove or smooth the excess hexadecane, the septum is placed between soft, dust-free tissue and is lightly pressed. An alternate way of coating is to devise an evaporation chamber, where hexadecane (or squalene) is delivered in definable amounts to only the aperture, without using solvent. In our laboratory this elaborate procedure had no advantage either in bilayer formation or in observing channels (compared with acetylcholine receptor channels). It is essential that the annulus along the perimeter of the hole, provided by hexadecane coating, is fluid, because the contact angle between bilayer and annulus needs to self-adjust to a particular value {White et al., *Biophys. J.* 16, 481 (1976)} for a stable bilayer to form. Hexadecane is, therefore, inappropriate for coating below 16°, where it freezes.

Step 2. The coated septum is placed on one half-cell and the second half-cell is placed on top. After setting the cell down, the tapered metal ring is pressed lightly downward on the tapered cell, which reliably ensures watertight contact between septum and cell compartment. The septum is centered in the hole of the cell and the cell is inserted into the cell holder in the Faraday cage with compartments at the front and the rear. The stage with amplifier and electrodes is lowered for a tight fit over the cell holder, (cf. FIG. 3c and d (omitted)). The electrodes should not touch the bottom or side walls to avoid microphonics. Add stirring bars if needed.

Step 3. The two syringes are filled with vesicle suspensions and inserted into the cell, and about 0.8 ml is placed in each half-cell.

Step 4. The two pipets are filled with 200 $\mu$l of the corresponding vesicle suspensions. Add suspension to the rear compartment by continuously forming small droplets, which fall to the interface. The water level should now be above the aperture (within 1 mm above the middle of the 4-mm hole as judged by visual inspection); if it is still too low, add more droplets; if too high, remove suspension with the syringe. The syringe is removed from the rear compartment (to lower pickup noise during monitoring of bilayer formation).

Step 5. In the same way, droplets are added to the front compartment. The scope should be watched during this step. Stop adding droplets when the sine wave signal jumps from $S_{sep}$ to $S_{sat}$, which normally occurs between addition of droplets.

Step 6. Immediately after the signal jumps to $S_{sat}$, the front water level is lowered until the signal returns to $S_{sep}$. Because the water surface tends to adhere slightly to the septum surface, this lowering should be done by a few short and stepwise pulls on the syringe. The water level is now just below the aperture and only a little additional volume should be required to form the bilayer.

Step 7. The front water level is again raised, this time using the syringe in a slow and continuous fashion, during which the capacitive signal should develop as shown in FIG. 4c (omitted), from $S_{sep}$ to $S_{bil}$ in 1–5 sec. Toward the end of formation, the signal rises briefly beyond the expected value for a bilayer, but then suddenly drops to $S_{bil}$ (see arrow in FIG. 4c (omitted)). This decrement reflects the "locking in" of the bilayer into its minimum area configuration within the hole. Remove the syringe, close the door of the Faraday cage. Switch input signal to dc.

Criteria

The planar membrane is normally stable and acceptable for quantitative channel studies provided the following three criteria are fulfilled: the bilayer is locked in to $S_{bil}$, bilayer formation succeeds at the first try, and no conductance artifacts are observed.

Comments

1. Bilayers which do not lock in to $S_{bil}$ are prone to break or to show artifacts due to physical mismatch and folding at the boundary, 2. Formation at the first try ensures that the protein-to-lipid ratio is conserved during bilayer formation. Repetitive tries (of Steps 6 and 7 above) lead to increasing deposition of material around the aperture, which contributes to the bilayer composition and which also impedes locking in.

3. First-try and locked-in bilayers may still show conductance artifacts (for possible reasons see below). The third criterion reads in practical terms: switch the sine wave off and apply a constant voltage of 100 mV. Reverse polarity about every 5 sec. If no conductance events in excess of capacitive spikes or expected channel conductances occur during 1 min, it is unlikely that artifacts will appear later even when the voltage is increased to 200 mV.

4. The rationale for addition of droplets is as follows. During the elevation of the water levels the total surface area to be covered by the monolayer (air-water interface and Teflon walls) increases. This leads to a transient reduction of the surface pressure π to below $π_e$. (See below the remark regarding lipid absorption by fresh cells.) This is compensated for by adding droplets. Because droplets are formed from vesicle suspensions, coverage of them by a monolayer begins during their formation. During passage of the droplet across the interface, part of this loosely packed monolayer is integrated into the monolayer at the interface. This temporarily raises the surface pressure (even above $π_e$), facilitating bilayer formation.[14]

Criteria not Fulfilled (Troubleshooting Guide)

Locking in Not Occurring or Too Slow or S Values ≠$S_{bil}$. (1) This is most often caused by the presence of too much hexadecane, so that the annulus is too thick for the bilayer to find its minimum area configuration. (2) This also occurs when the vesicles show a considerable degree of aggregation. (3) For locking in the diameter of the aperture should be at least 10 times the septum thickness.

Bilayer Breaks during Formation. (1) This is most often caused by surface pressure ($π<π_e$) that is too low. This relates to the inappropriate vesicle sample conditions mentioned above. One more technical cause should be added. The rough surface of fresh, dry Teflon cells adsorbs a considerable amount of lipid when vesicle sample is added. This slows down the approach to $π_e$, which becomes critical under conditions where the monolayer formation rate is already slow. In this case it helps to preincubate the cell with vesicle suspension before use. (2) Check the hexadecane solution for dust or replace it (3) Replace the septum or check the septum used for irregularities around the perimeter of the hole. (4) Coating may be imperfect, i.e., the Teflon surface at the hole is not homogeneously coated with hexadecane. (5) Lytic materials are present (see below, Conductance Artifacts).

No Onset of Bilayer Formation. This is mostly caused by imperfect apertures as well as the same reasons listed above for breakage.

Conductance Artifacts. When bilayers have formed at the first try and are locked in properly but show artifactual conductances, and this occurs after replacing septum and coating solution, this is not due to the bilayer formation procedure but rather the presence of artifact-inducing materials (AIMs). There are two ways to proceed: identification of origin and measures to avoid AIMS. Knowledge is required of possible origins, at least of classes of origins, which is a nontrivial task because some materials (see below) induce artifacts at extremely low concentrations. AIMS may be found in the buffer, the lipid preparation, the coating solution, the Teflon cell, glassware, pipets, syringes, Teflon tubing, and paper tissue.

Avoidance of AIMS. (1) Glassware, before being washed, should be cleansed of any tape residue or colors from marking pens, because these materials often are or contain very potent ionophoric or lytic materials. (2) Plasticizers also are dangerous. Plastic tips for pipets, plastic dispensers, or containers, or any plastic which comes into intimate contact with solutions for bilayer work, should be avoided or carefully checked. (3) Other major sources of AIMS are microorganisms and their metabolites. Filtering buffers with sterile 0.2-μm filters are often not sufficient. Metabolites have been found to survive even double distillation. Crucial glassware (for vesicles and buffers) should be sterile at the start and water should be as clean as possible; techniques such as serial deionization, activated charcoal filtering, sterile filtering, and double distillation should be used. If facilities are available, stock buffers should be autoclaved.

Avoidance and Identification of AIMs. This necessitates rigid control of all preliminary and peripheral components of bilayer work. The following strategy is easy to establish and has proved valuable. For all solutions and materials used, one should save (under stable conditions) controls that reliably yield AIMs-free bilayers and thus can be used for cross-checks to identify origins of AIMs. For example, coating solution should be prepared in a large batch, divided into about 100 ampules of 1 ml each (in a dust-free hood), and stored at −20°. Before the batch is used up, prepare a new one. This procedure should be applied to lipid samples [ampules with different kinds of lipids or common lipid mixtures in solvent, directly used for vesicle formation (see Appendix I-C)]; buffers (bottles with 20 ml of standard buffers used for vesicle formation), Teflon tubing for 1-ml syringes (100 m cleaned and stored, 20×5 m in airtight sacs, at −20°); paper tissue, which should be purchased in large stock and dated; Teflon sheets, Teflon cells, and dishwashing detergent.

As stated in Schindler, "Planar Lipid-Protein Membranes . . . ," 171 *Methods in Enzymology* 225 (1989), at pages 247–53:

Start-Up Kit for Users

We regard the information presented regarding this technique to be rather complete. In setting up the bilayer apparatus and getting used to the assays two difficulties are generally encountered One relates to the fabrication of Teflon septa with precise apertures and of a cell with the appropriate shape (see Mechanical Parts and Appendix I-B). For starting up experimentation of this type we can provide a few septa with different aperture sizes and one bilayer cell (which we request be returned to us after being copied). Additional septa can be purchased from our institute for a reasonable price.

The second difficulty concerns acquiring expertise in performing channel analysis using the assays described. It is advisable to gain confidence by using a stable, nondelicate channel protein that allows for a representative screening of the assays described. For this purpose we suggest using two different types of channel proteins. One is a porin, PhoE kindly provided as purified trimers by Dr. J. Rosenbusch, Biozentrum, University of Basel). Typical PhoE channel conductance traces are shown in FIGS. 6*a* and *b* (omitted). Channel characteristics are almost identical to those of matrix protein channels {Schindler et al., *Proc. Natl. Acad. Sci. U.S.A.* 78, 2302 (1981); Engel et al., *Nature (London)* 317, 643 (1985)} (see FIG. 5 (omitted)). Trimers form triple channels in associates of trimers, with a voltage-dependent open-close equilibrium. The protein is very stable and easy to handle. The other protein is colicin A [kindly provided in purified form by D. F. Pattus, European Molecular Biology Laboratory (EMBL) Heidelberg, Federal Republic of Germany]. Colicin A is a bacterial toxin that provides an example of channel formation upon protein insertion in the membrane from the aqueous phase. {Shein et al., *Nature (London)* 276, 159 (1978); Pattus et al., in "Physical Chemistry of Transmembrane Ion Motions" (G. Spach, ed.), p. 407. Elsevier, Amsterdam, 1983.} A typical channel trace is shown in FIG. 6*c* (omitted). Channel formation upon insertion requires application of voltage with certain polarity, {Shein et al., *Nature (London)* 276, 159 (1978)} the equilibrium between open and closed states is highly voltage-dependent and the single channel conductance is dependent onpH {Shein et al., *Nature (London)* 276, 159 (1978)} and $π_e$ {H. Schindler, unpublished observations (1988)}. These dependencies, as well as others not mentioned, will provide a detailed exercise to gain confidence in channel characterization.

{FIG. 6 (omitted) shows:} PhoE channel traces. (a) Multiple-channel trace upon application of 100 mV. (b) Triple-channel events with voltage-induced closing at a constant 150 mV of both polarities. Voltage reversal after channel closing leads to transient channel opening, indicating two distinct closed states for either voltage polarity. Application of 100 mV (trace a) leads to only partial voltage-driven closing. These features (including others not shown) are the same as observed for matrix protein channels {Schindler et al., *Proc. Natl. Acad. Sci. U.S.A.* 78, 2302 (1981); Engle et al., *Nature (London)* 317, 643 (1985)}. Lipids used were soybean lipid with cholesterol [12:1 (w:w)]. Aqueous phases contained 100 mM NaCl, 0.1 m/M EGTA, and 0.2 mM $NaCl_2$ and were buffered to pH 7.4. (c) Colicin A channel trace. Colicin A was added to one side of a preformed planar membrane to a final concentration of 0.1 ng/ml. After ~20 sec, channel conductance events are observed, the number increasing in time to a (voltage-dependent) stationary value. Colicin A insertion to form active channels requires the presence of voltage across the bilayer, with more positive potential at the side of colicin addition. Once activated, the channels show a voltage-dependent open—closed equilibrium {Shein et al., *Nature (London)* 276, 159 (1978); Pattus et al., in "physical Chemistry of Transmembrane Ion Motions" (G. Spach, ed.), p. 407. Elsevier, Amsterdam, 1983}. Soybean lipid was used. Aqueous phases contained 1 M KCl and were buffered to pH 6.1.

Appendix I-A

{FIG. 7 (omitted) shows:} Circuit diagrams to build a dc source (a), a sine wave source (b), and a current-to-voltage converter (c), trafo, Transformer.

The elements shown in (a) are mounted on a metal box (about 10×12×6 cm). Three switches (S1, S2, and S3) and two potentiometers P2; these are 1-kΩ, 10-turn potentiometers with dials) are on top and three BNC jacks are at one side. Voltage is supplied to R1 (220Ω) using a 1.5-V battery (9 Ahr), where switch S1 selects polarity and zero voltage (+V, 0, −V). Switch S2 selects between two voltage dividers. This allows for voltage jumps between preset voltage values using the 10-turn potentiometers. The trim-potentiometers (P1, 500Ω) are adjusted to 100 mV per turn of P2. Switch S3 selects between the three kinds of input sources used.

One loop around the transformer (depicted in FIG. 7b (omitted), "trafo") provides a sine wave at line frequency, the peak-to-peak value of which is adjusted by the trim-potentiometer to about 16 mV, used to monitor planar bilayer formation.

A small circuit board (about 2×5 cm) (depicted in FIG. 7c (omitted)) carries the amplifier (type OPA 128LM, Burr Brown, Tucson, Ariz.) the 10-kΩ trim-potentiometer, the feedback resistor $R_f$ (ELTEC Instruments, Inc., Daytona Beach, Fla. Model 104), available with resistance values (1, 2, and $5×10^n$, n= . . . 8, 9, 10, 11), and a third wire which defines capacitance to 0.002 pF. The negative input of the amplifier should be shielded and directly connected with the Ag—AgCl electrode via a high-ohmic, low-capacitance jack. Voltage (+15 and −15 V) is supplied by 20 1.5-V batteries mounted in a box within the Faraday cage and the output signal $V_{out}$ is connected to a BNC jack at the rear of the Faraday cage, as is the input signal. As a housing for the circuit board we use a cylindrical steel tube about 2 cm in diameter and 5 cm long.

Appendix I-B

FIG. 8 (omitted) illustrates the fabrication of Teflon septa. Sharp steel punches are used to obtain Teflon rings of 50-$\mu$m FEP Teflon with a 4-mm inner diameter and 16-mm outer diameter and 6- or 12-$\mu$m PTFE disks 12 mm in diameter (both types of Teflon are purchased from Saunders Corp., Los Angeles, Calif.). The three sheets are sandwiched between stainless-steel blocks, both covered inside with smooth aluminum foil. The blocks are connected by springs (spring force about 0.5 N, which should not significantly drop during heating) and are heated for about 4 min in an oven at 500°. During this, the assembly is positioned between preheated ceramic plates to ensure even heat flow from top and bottom. After removing the oven the assembly is shock-cooled by thrusting it into cold water. This procedure should yield a septum, the outer rim of which is fused where the FEP sheets are in contact. The FTFE sheet in the 4-mm inner part should be planar. The contact between FEP and PTFE should be tight (they are not fused together because the melting temperature of PTFE should not be reached during heating). To obtain such septa there are three adjustable parameters: time of heating, spring force, and weight of ceramic plate. The aluminum foil should be replaced if the septum starts to stick to it. Apertures are punched with sharpened stainless-steel tubes (sharpened only from the inside). Fabrication of punches is a rather involved procedure, requiring a special drilling tool with conical shape, triangular cross-section, and sharp tip. This is moved into a revolving stainless-steel tube with self-adjustment of the triangular tool to the inner rim of the steel tube (bending forces of the thin tube during sliding in of the tool should be minimized by control under a microscope). During sharpening by slowly moving the tool inward (use a hydraulic stage), a fine grindstone is held to the outer rim of the tube at one edge of the triangular tool in order to avoid bending out the rim and to polish the outside of the tube.

{FIG. 8 (omitted) shows:} Schematic representation of the assembly of the Teflon septum from three sheets (a) in a spring-loaded clamp (b), the FEP outer rings of which are fused together in an oven (c); puncing a hole with a steel punch sharpened only on the inside (d).

Appendix I-C

Lipid Vesicles

Lipid vesicles are generally used for diluting lipid-protein vesicles to appropriate overall lipid-protein ratios and for generating the different types of initial distributions of protein in the planar bilayer.

Preparation method {Schindler et al., *Proc. Natl. Acad. Sci. U.S.A.* 77, 3052 (1980)}: 20 mg of lipid in 4 ml of solvent is added to a 1-liter round-bottom flask. The lipid is dried down to a thin film in the following way. A stream of nitrogen is applied via a Pasteur pipet inserted into the flask. The flask is rapidly swirled in such a way that the solvent remains spread as thinly as possible until it is evaporated. To remove residual solvent, nitrogen flow is continued for a few minutes. Buffer is always filtered through a 0.2-$\mu$m sterile filter directly into the flask. After adding about 30 glass beads (2 mm in diameter, carefully cleaned), the flask is rotated for 5 to 10 min such that rolling of the glass beads is smooth and extends over the whole lipid film. The resulting vesicle suspension is filtered through a 0.4 $\mu$m polycarbonate filter (Nuclepore) into a sterile flask. This simple and fast method yields vesicles which are well-suited for planar bilayer formation (cf Appropriate Vesicle Suspensions) with however, restrictions on the choice of lipids. The presence of at least a small percentage of negatively charged lipids appears to be required, otherwise multilamellar structures and aggregation dominate, reducing monolayer formation rates to below reasonable values (discussed earlier).

Lipid-Protein Vesicles

Fast dilution technique {Schindler et al., *Proc. Natl. Acad. Sci. U.S.A.* 81, 6222 (1984)}: The procedure is the same as for lipid vesicles described above except for the addition of protein to the buffer. Since details are of importance the procedure will be described step by step. (1) Prepare a lipid film in a round-bottom flask with continuous nitrogen flow until step 5. (2) Prepare a crude suspension of the same lipid by adding about 5 mg of dry lipid to 2 ml of buffer, then vortex for 10 sec. (3) About 1 ml of this suspension is added to 19 ml of buffer by filtering it through an 80 to 200-nm polycarbonate filter (choose pore size as small as possible but with easy flow of suspension). (4) Immediately after step 3, add a small aliquot (1–5 $\mu$l) of protein sample (purified protein in detergent and, optionally, lipid) to the 20 ml of buffer during both shaking and mild bath sonication of the buffer. (5) The buffer is immediately added to the flask and the lipid film is resuspended with glass beads as described above.

This technique has been devised to ensure single protein incorporation into vesicles and to achieve much lower detergent-to-lipid ratios as in dialysis methods. The rationale is as follows. Protein is added in such a way (low amount in large volume during shaking and sonication) that the proteins are immediately dispersed. If they were single in detergent, they will still be single after the fast dilution technique, because encounters are highly improbable. The detergent added with the protein is also "fast diluted," but there is sufficient lipid present to which the protein can associate with during loss of detergent. More precisely, the described way of adding lipids ensures that there are pre-vesicular or nonclosed lipid structures offering sufficient association sites for the few proteins added. During resuspension of the lipid film, these structures are partly integrated into forming vesicles or partially complemented to vesicular structures. This is inferred from the relatively high recovery of the (p/l) ratio when monolayers are formed from these vesicles. For example, for the acetylcholine receptor the recovery was 70%, i.e., $n_{fast\ dil} = (p/l)_{mon}/(p/l)_{bulk} = 0.7$. Also, the detergent-to-lipid ratio may be lowered to $10^{-5}$ or $10^{-6}$ when fast dilution is followed by dialysis for 1 or 24 hr, respectively. During dilution the detergent molecules primarily dissolve into the buffer and can therefore be removed to a greater extent, as after vesicle formation by dialysis. Detergent is apparently trapped in lipid structures as inferred from the low detergent-to-lipid ration of $10^{-4}$ after exhaustive dialysis.

It should be added that this fast dilution technique is applicable only for incorporation of small amounts of protein; optimal conditions for step 4 are the addition of 2 $\mu$l of protein sample with about 10 $\mu$g/ml protein. The number of lipids in the film should be adjusted to yield appropriate (p/l) ratios for the particular assays to be employed.

What is claimed is:

1. A fuel cell comprising a first compartment, a second compartment and a barrier separating the first and second compartments, wherein the barrier includes an embedded proton transporting protein effective to transport protons from the first compartment to the second compartment.

2. A fuel cell comprising:

a first compartment;

a second compartment;

a barrier separating the first compartment from the second compartment; said barrier having embedded proton transporting proteins effective to transport protons from the first compartment to the second compartment;

a first electrode;

a second electrode;

redox enzymes in the first compartment in communication with the first electrode to deliver electrons thereto;

an electron carrier in the first compartment in chemical communication with the redox enzymes; and an electron receiving composition in the second compartment in chemical communication with the second electrode, wherein, in operation, an electrical current flows along a conductive pathway formed between the first electrode and the second electrode.

3. The fuel cell of claim 2, wherein the first compartment comprises an electron transfer mediator that transfers electrons from the redox enzymes to the first electrode.

4. The fuel cell of claim 2, wherein the proton transporting proteins include redox enzyme activity.

5. The fuel cell of claim 2, adapted to operate at the first electrode at a temperature of about 60° C. or less.

6. The fuel cell of claim 2, further comprising a reservoir for supplying to the vicinity of at least one of the electrodes a component consumed in the operation of the fuel cell and a pump for drawing such component to that vicinity.

7. The fuel cell of claim 6, further comprising a controller which receives data on the operation of the fuel cell and controls the pump in response to the data.

8. The fuel cell of claim 2, further comprising:

an electron transfer mediator effective to facilitate transfer of electrons to the first electrode.

9. A method of operating a fuel cell with a first compartment and a second compartment comprising:

enzymatically oxidizing an electron carrier and delivering the electrons to a first electrode in chemical communication with the first compartment;

catalyzing with proteins the transfer of protons across a barrier from the first compartment to the second compartment; and reducing an electron receiving molecule with electrons conveyed through a circuit from the first electrode to a second electrode located in the second compartment.

10. The method of claim 9, wherein the catalytic transfer of protons occurs in conjunction with the enzymatic oxidation of the electron carrier.

* * * * *

UNITED STATES PATENT AND TRADEMARK OFFICE
CERTIFICATE OF CORRECTION

PATENT NO. : 6,500,571 B2  Page 1 of 1
DATED : December 31, 2002
INVENTOR(S) : Michael James Liberatore et al.

It is certified that error appears in the above-identified patent and that said Letters Patent is hereby corrected as shown below:

Column 2,
Line 19, "fuel cell a first" should read -- fuel cell comprising a first --.

Column 3,
Line 1, "the like Further" should read -- the like. Further --.

Column 6,
Line 45, "include" should read -- includes --.

Column 7,
Line 8, "(electrodes can" should read -- (electrodes) can --.
Line 65, "using" should read -- uses --.

Column 10,
Line 32, "can be separating" should read -- can be a separating --.
Line 59, "toke" should read -- took --.

Column 18,
Line 30, "fling" should read -- filling --.

Signed and Sealed this

Twenty-sixth Day of August, 2003

JAMES E. ROGAN
*Director of the United States Patent and Trademark Office*